(12) United States Patent
Nagata et al.

(10) Patent No.: US 7,525,213 B2
(45) Date of Patent: Apr. 28, 2009

(54) WAVE ACTIVATED POWER GENERATION DEVICE AND WAVE ACTIVATED POWER GENERATION PLANT

(75) Inventors: Yoshihiro Nagata, Yokohama (JP); Toshio Konno, Yokohama (JP)

(73) Assignee: Toyo Technology Inc., Yokohama-shi (JP)

( * ) Notice: Subject to any disclaimer, the term of this patent is extended or adjusted under 35 U.S.C. 154(b) by 82 days.

(21) Appl. No.: 11/576,293

(22) PCT Filed: Sep. 22, 2005

(86) PCT No.: PCT/JP2005/017459

§ 371 (c)(1), (2), (4) Date: Mar. 29, 2007

(87) PCT Pub. No.: WO2006/035660

PCT Pub. Date: Apr. 6, 2006

(65) Prior Publication Data

US 2008/0088133 A1    Apr. 17, 2008

(30) Foreign Application Priority Data

Sep. 30, 2004    (JP)    ............................. 2004-286741

(51) Int. Cl.
*F03B 13/12* (2006.01)

(52) U.S. Cl. ...................................... 290/53

(58) Field of Classification Search ................... 290/53
See application file for complete search history.

(56) References Cited

U.S. PATENT DOCUMENTS 3,064,137 A * 11/1962 Corbett, Jr. et al. ........... 290/53
3,603,804 A *  9/1971 Casey ........................... 290/42
3,922,739 A * 12/1975 Babintsev ..................... 441/16
3,925,986 A * 12/1975 Barwick ....................... 60/398
3,988,592 A * 10/1976 Porter .......................... 290/53
4,098,081 A *  7/1978 Woodman .................... 60/398
4,271,668 A *  6/1981 McCormick ................. 60/398

(Continued)

FOREIGN PATENT DOCUMENTS

JP        40-28004        12/1965

(Continued)

*Primary Examiner*—Joseph Waks
(74) *Attorney, Agent, or Firm*—Oblon, Spivak, McClelland, Maier & Neustadt, P.C.

(57) ABSTRACT

A wave activated power generation device includes a cylindrical floating body anchored on water and extending vertically to a water surface, a ballast provided at a lower end portion of the floating body, and a power generating equipment provided at an upper end portion of the floating body. The floating body includes a buoyancy control chamber allowing the floating body to vertically float in the water and adjusting a position of the floating body relative to the water surface to a predetermined height in accordance with a relation between buoyancy of the floating body and weight of the ballast, and an air chamber formed between the buoyancy control chamber and the power generating equipment. The power generating equipment includes an air turbine provided above the air chamber and driven by air flow generated between an inside and outside of the air chamber by vertical motion of the water surface, and a generator rotationally driven by the air turbine. Furthermore, a wave activated power generation plant includes the coupled plural wave activated power generation devices upon request.

19 Claims, 16 Drawing Sheets

U.S. PATENT DOCUMENTS

| | | | | |
|---|---|---|---|---|
| 4,286,347 A | * | 9/1981 | Modisette | 60/398 |
| 4,441,316 A | * | 4/1984 | Moody | 60/398 |
| 4,719,754 A | * | 1/1988 | Nishikawa | 60/501 |
| 5,770,893 A | * | 6/1998 | Youlton | 290/53 |

FOREIGN PATENT DOCUMENTS

| | | | |
|---|---|---|---|
| JP | 50-45143 | | 4/1975 |
| JP | 50-139244 | | 11/1975 |
| JP | 54-159536 | | 12/1979 |
| JP | 58-154871 | | 10/1983 |
| JP | 58183872 A | * | 10/1983 |
| JP | 60-90990 | | 5/1985 |
| JP | 2-122178 | | 10/1990 |
| JP | 6-200516 | | 7/1994 |
| JP | 09242657 A | * | 9/1997 |
| JP | 11-201014 | | 7/1999 |
| JP | 2001-151192 | | 6/2001 |
| JP | 2004-100518 | | 4/2004 |

* cited by examiner

WAVE ACTIVATED POWER GENERATION DEVICE AND WAVE ACTIVATED POWER GENERATION PLANT

TECHNICAL FIELD

The present invention relates to a wave activated power generation device that is provided with a floating body anchorable on water and a power generating means mounted on the floating body, and that generates electricity using wave energy and also relates to a wave activated power generation plant that includes the wave activated power generation devices.

BACKGROUND ART

There is plenty of wave energy in the sea, and the wave energy is accessible. Because of the accessibility, wave power generation that utilizes wave energy has been studied in various manners so far in our country and foreign countries and some experiments have been conducted actually in the sea. Nevertheless, due to the reasons, such as 1) high costs, 2) extensive safety measures, and 3) blot on the landscape, wave power generation has not spread in earnest.

Some existing inventions that utilize wave energy have been proposed, for example, in Japanese Unexamined Patent Application Publication No. 10-176649 (Patent Document 1) "Wave Activated Turbine Power Generation By Pole Change Induction Generator And Operating Method Thereof", Japanese Unexamined Patent Application Publication No. 11-201014 (Patent Document 2) "Wave Activated Power Generation Equipment", Japanese Unexamined Patent Application Publication No. 9-287546 (Patent Document 3) "Turbine For Wave Activated Generation", and Japanese Unexamined Patent Application Publication No 2001-151192 (Patent Document 4) "Ocean Platform For Monitoring Earth Warming".

Patent Document 1 describes an existing device, in which the rotational speed of a generator is appropriately controlled to improve efficiency, thus making it possible to increase electric power to be generated. Patent Document 2 describes an existing device, in which a generator is always rotated in one direction by means of a wells turbine, thus realizing simplification of the structure. Patent Document 3 also describes a similar existing device, in which the angles of rotary blades of a turbine or the angles of guide blades are controlled in accordance with the flow of air to always rotate a generator in one direction, thus rendering simplification of the structure and improvement in efficiency of power generation Patent Document 4 describes an existing device, in which a horizontal stabilizer is provided to render improvement in the conversion efficiency of wave energy.

However, the existing devices described in Patent Document 1 and Patent Document 3 require excessively complex mechanism and controlling operation and, therefore, have a drawback in that the costs of construction and maintenance may not be reduced so much. The existing device described in Patent Document 2 also has a drawback in that, because the device is settled on the sea floor, the costs of safety measures for construction and maintenance may not be reduced so much, and, in addition, because disassembly for maintenance is troublesome, it requires a lot of man hours and an extended construction period. Furthermore, it also has a drawback in that trying to increase the efficiency using a wells turbine increases costs accordingly.

The existing device described in Patent Document 4 has a drawback in that, because a platform portion located on the surface of the sea is spherical in shapes it is largely effected by vertical motion of waves, thus impeding collection of wave energy.

DISCLOSURE OF THE INVENTION

The present invention was conceived in consideration of the circumstances mentioned above and an object of the present invention is to provide a wave activated power generation device and a wave activated power generation plant utilizing the same capable of reducing the device manufacturing cost and installation cost, and having no necessity of fixing to a sea bed, being excellent in maintenance performance and safety performance, and being applied no influence to a neighboring appearance In order to achieve the above object, the present invention provides a wave activated power generation device comprising:

a cylindrical floating body anchored on water and extending in a vertical direction relative to a surface of the water;

a ballast provided at a lower end portion of the floating body; and a power generating equipment provided at an upper end portion of the floating body, wherein the floating body includes a buoyancy control chamber that allows the floating body to vertically float in the water and that adjusts a position of the floating body relative to the surface of the water to a predetermined height in accordance with a relation between buoyancy of the floating body and weight of the ballast, and an air chamber that is formed between the buoyancy control chamber and the power generating equipment, and the power generating equipment includes an air turbine provided above the air chamber and driven by an air-flow generated between an inside and outside of the air chamber by vertical motion of the surface of the water, and a generator rotationally driven by the air turbine In preferred embodiments of the above aspect, the following preferred examples may be adopted.

A natural period T of vertical motion of the floating body is calculated by the following equation using an area of a horizontal cross-section of a cylindrical portion of the floating body and a mass of the wave activated power generation device:

$$T = 2\pi \times SQR(M/(S X \rho X g))$$

where "T" is a natural period (s) of vertical motion of the floating body, "S" is a horizontal cross-sectional area ($m^2$) of a upper half cylindrical portion of the floating body, "M" is a overall mass (kg) including seawater inside the wave activated power generation device, "$\pi$" is the ratio of the circumference of a circle to its diameter, "$\rho$" is a density ($kg/m^3$) of seawater, "g" is the acceleration ($m/s^2$) due to gravity, and "SQR(x)" is the function calculating a square root of x, and wherein the natural period T is in a range of 0.8 to 1.6 times an annual average wave period at an anchored area.

The air turbine airways rotates in one direction independently from a direction of a reciprocating air flow generated between the inside and outside of the air chamber, and wherein the air turbine includes a floating nozzle movable by a predetermined distance in a direction of a rotary shaft thereof in accordance with a direction of the air flow. A diaphragm may be used as means for moving the floating nozzle. A piston may be used as means for moving the floating nozzle.

The wave activated power generation device may further includes a electrolyzer provided near the ballast provided at the lowermost portion of the floating body for electrolyzing water using electric power that is outputted from the generator, and a space provided near the lowermost portion of the floating body for collecting and storing hydrogen generated by the electrolyzer.

The floating body is divided into three sections of a upper portion, an intermediate portion, and a lower portion, in which the intermediate portion is formed so that unit members each having a predetermined length are axially connected, wherein the overall length of the floating body is set by changing the number in which the unit members are provided, and the floating body is constructed and assembled by connecting the three sections by means of a connecting member Each unit member that constitutes the intermediate portion of the floating body may be manufactured so as to provide a same shape by die forming using a plastic material The connecting member may be a wire rope or a through-bolt adjustable in length The wave activated power generation device may further include a watertight control chamber provided at the upper portion of the floating body, and an automatic valve provided in the control chamber, wherein the automatic valve automatically performs an opening operation in response to a detection of sea wind force larger than a undetermined value, so that the overall wave activated power generation device is evacuated into the water by discharging gas inside the buoyancy control chamber so as to decrease the buoyancy of the wave activated power generation device.

The wave activated power generation device may further include a wind turbine provided at a upper portion of the floating body, and a second generator provided at the upper portion of the floating body and driven by rotation of the wind turbine.

The ballast has a ring shape and has a outer diameter larger than a outer diameter of the cylindrical portion of the floating body.

The wave activated power generation device may further include a pressure regulating valve is provided at the cylindrical portion of a portion of the floating body, which constitutes the air chamber, wherein the pressure regulating valve is configured to detect pressure in the air chamber so as to introduce ambient air into the air chamber when the pressure is reduced and comes closer to a vacuum.

According to another aspect of the present invention, the above object may be also achieved by providing a wave activated power generation plant according to claim 1, comprising:

a plurality of wave activated power generation devices that are anchored on water, at least one linking device that couples the plurality of wave activated power generation devices with a predetermined interval therebetween; and a product collecting device connected to the linking device, wherein each of the wave activated power generation devices includes a cylindrical floating body anchored on the water and extending in a vertical director relative to a surface of the water, a ballast provided at a lower end portion of the floating body, ad a power generating equipment provided at an upper end portion of the floating body, the floating body includes a buoyancy control chamber that allows the floating body to vertically float in the water and that adjusts a position of the floating body relative to the surface of the water to a predetermined height in accordance with a relation between buoyancy of the floating body and weight of the ballast, and a air chamber formed between the buoyancy control chamber and the power generating equipment, the power generating equipment includes a air turbine provided above the air chamber and driven by a air flow generated between a inside and outside of the air chamber by vertical motion of the surface of the water, and a generator that is rotationally driven by the air turbine, and the linking device includes at least one joint member provided on an outer peripheral portion of the floating body at a predetermined angular interval, and a link member pivotally coupled to the joint member.

In the above aspect, the product collecting device may be a hydrogen collecting device, the product collecting device includes a electrolyzer provided near the ballast provided at the lower end portion of the floating body and electrolyzing water using electric power that is outputted from the generator, and a hydrogen collecting portion provided near the lowermost portion of the floating body and storing and collecting hydrogen generated by the electrolyzer.

It is desirable that the floating body is divided into three sections of an upper portion, an intermediate portion, and a lower portion, in which the intermediate portion is formed so that unit members each having a predetermined length are a axially connected, the overall length of the floating body is set by changing the number in which the unit members are provided, and the floating body is constructed and assembled by connecting the three sections by means of a through-bolt adjustable in length The through-bolt may have a hollow shape and include one of an electric power line for supplying electric power that is outputted from the generator to the electrolyzer and a conduit member for leading hydrogen generated at the electrolyzer to the product collecting device.

The product collecting device may be an electric power collecting device connected to each of the wave activated power generation devices.

According to the wave activated power generation device and wave activated power generation plant of the present invention having the above described features, because the floating body that forms a device body is not fixed to the sea floor but it is anchorable, its management is easy and it is much less likely to be damaged by the size of wave. In addition, in the depth of the sea where water is almost stationary without being affected by surface waves, resistance of water becomes extremely large when the floating body is moved up and down by the difference between buoyancy and weight, whereas near the surface of the sea, force applied to the floating body due to wares becomes minimum, so that power generation may efficiently be performed utilizing wave energy.

In addition because the natural period T of vertical motion of the floating body is determined in the range of 0.8 to 1.6 times an annual average wave period at an anchored area, a phase difference between the ware motion and the vertical motion of the floating body is approximately 90 degrees. This can make the difference of the vertical position between the wave and the floating body to be equal to or more than the height of the wave. Hence, the conversion efficiency of wave energy may be improved Moreover, because a generator is driven by means of an air turbine that is always rotated in one direction independently from the direction of reciprocating air flow, it is advantageous if that the conversion efficiency of wave energy may be improved.

Furthermore, because the floating body is divided into three sections, that is, a upper portion, a intermediate portion, and a lower portion, and the intermediate portion is constructed by connecting unit members each having a predetermined axial length. The overall length of the floating body may be selected by changing the number in which the unit length members of the intermediate portion are provided in accordance with the depth of the sea, annual average wave height, annual average wave period, or the like. Thus, it is applicable to wide range of installation conditions without any change in the basic design. As a result, it is advantageous in standardization and mass production.

Furthermore, by connecting the plurality of wave activated power generation devices of the present invention various embodiments may be rendered in accordance with installation conditions and desired power generation capacity

BEST MODE FOR CARRYING OUT THE INVENTION

Hereinafter, an embodiment according to the present invention will be described with reference to the accompanying drawings.

The present invention provides a device that performs wave power generation by converting wave (wave power) energy, that comes from the vertical motion of waves into electric energy to collect the electric energy. First, the principles of the present invention will be described with reference to FIG. 1. It is to be noted that the following description is made on the assumption that a floating body (which will be described later) are installed in the sea However, even in water areas such as lakes, a floating body according to the present invention may be located. In addition, in the following description, it should be understood that the description related to directions, such as upper, lower, right, and left, is referred to under the condition that the wave activated power generation device is installed so as to float in water unless otherwise explicitly stated.

Figure 1:
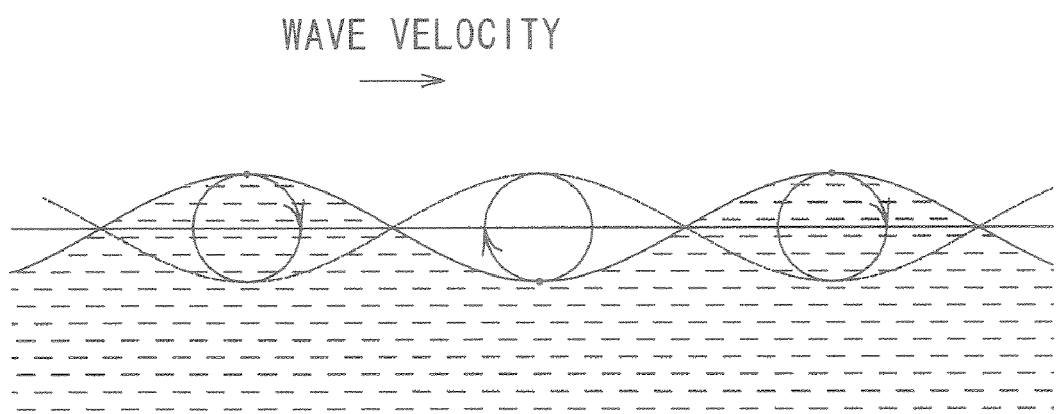
FIG. 1 is an explanatory view that illustrates the motion of waves.
Figure 2:
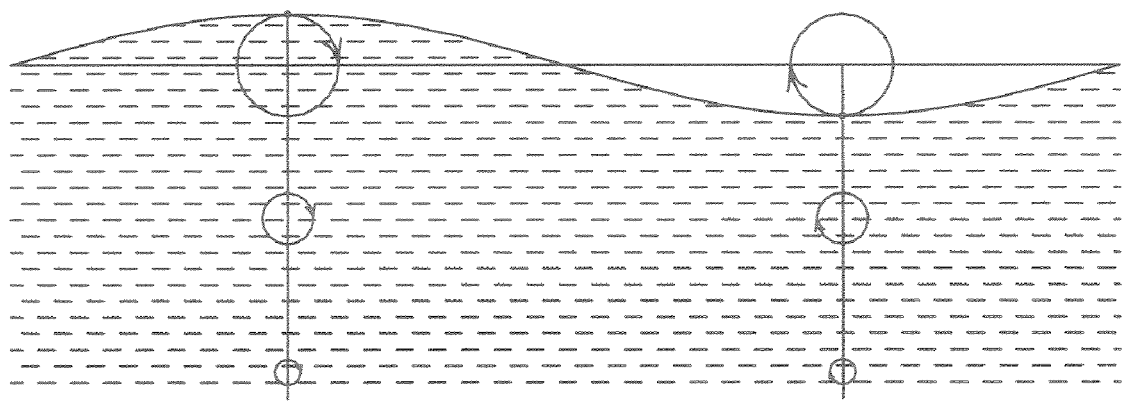
FIG. 2 is a schematic explanatory view that illustrates the motion of water particles that vary depending upon the depth of water.

As shown in FIG. 1, when the wavelength is smaller than the depth of water any point of the water surface performs a circular motion with a radius equal to the amplitude of the wave within the vertical plane. While on the other hand, as shown in FIG. 2, any point of the body of water below the water surface also performs a circular motion. However, the radius of the circular motion sharply gets smaller as it becomes deep in the water from the water surface, Then, water hardy moves below the depth equal to or more than approximately the half wavelength, which has been theoretically proved (refer to, for example, "Fluid Dynamics", the sixth edition, written by Fujimoto Takesuke, published in 1960 with Yokendo). The above principles being kept in mind, an embodiment of a wave activated power generation device according to the present invention will be described.

A wave activated power generation device PM according to the present invention is structurally constituted of a cylindrical floating body that includes a upper portion PMa appearing above the surface of the sea, a portion PMb that is submerged into the sea below the surface of the sea, and a lower portion PMc, whose operation will be described later. Although it will be described later, it has a configuration including a control portion, a wind turbine portion, a wave power generating portion, and a buoyancy control portion.

Figure 3:
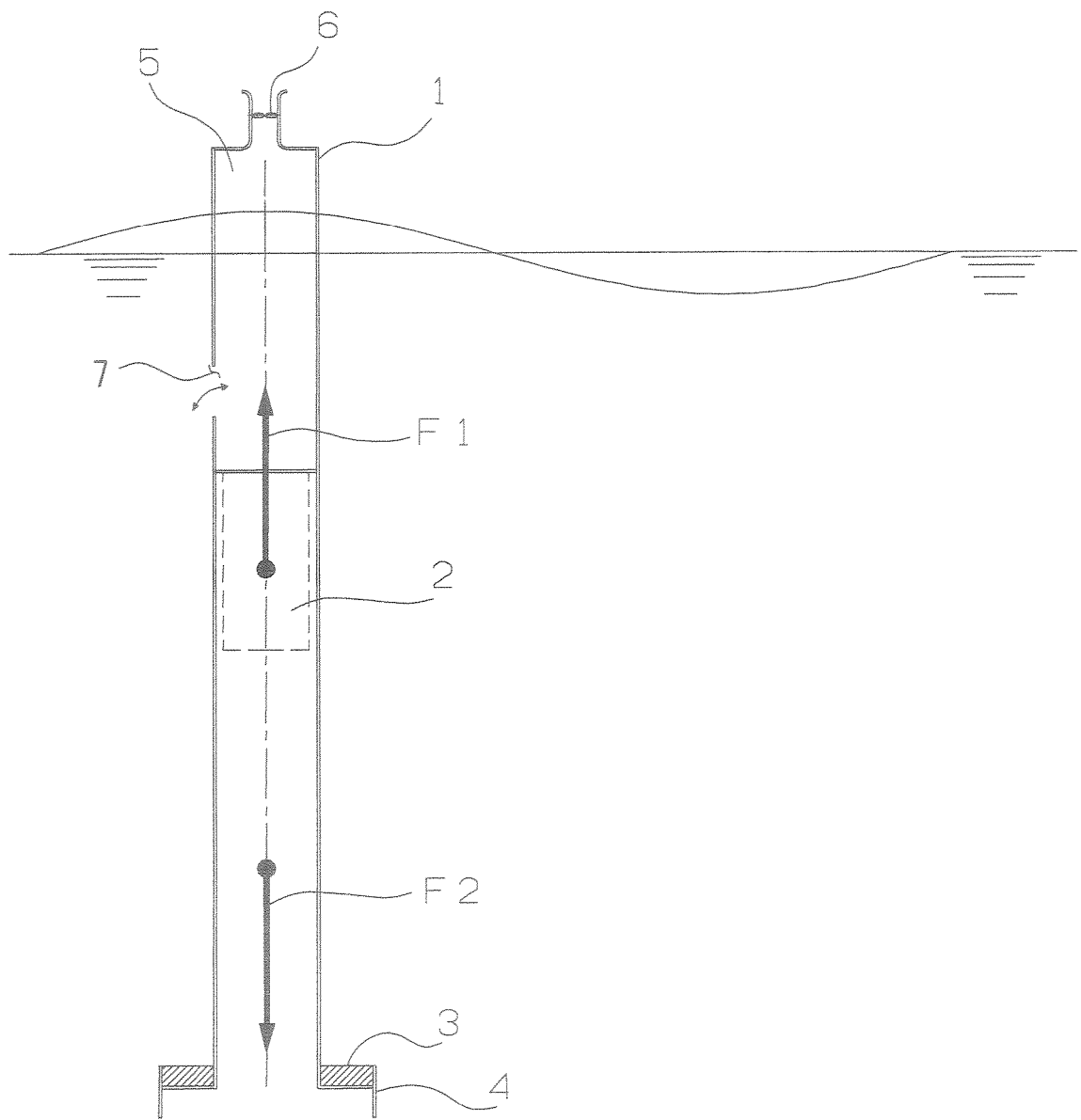
FIG. 3 is a schematic cross-sectional view that illustrates the vertical motion of a floating body in an embodiment of a wave activated power generation device according to the present invention.

FIG. 3 schematically shows the structure of substantial part of the cylindrical floating body 1 in a state where the elongated cylindrical floating body 1 is located in the sea. As shown in FIG. 3, a buoyancy control chamber 2 for receiving buoyancy F1 is provided substantially at the center portion of the body of the floating body 1. The buoyancy control chamber 2 allows the cylindrical body to float vertically and adjusts the position of the floating body 1 relative to the water surface to a predetermined height The buoyancy control chamber 2 is formed independently from the floating body 1 and is a kind of air reservoir having an inverted dome shape. The buoyancy control chamber 2 is fixed to the inner wall of the body of the floating body, for example, by means of a bolt or the like.

The inside of the floating body 1 is partitioned by the upper end portion of the buoyancy control chamber 2. The lower end portion of the floating body 1 is open, and seawater may freely enter and exit. The floating body 1 is provided at the lowermost end portion thereof with a ballast 3 for adjusting weight F2 of the floating body 1. The ballast 3 is provided on an annular flange portion 4 for suppressing the vertical motion of the floating body 1. For that purpose, the ballast 3 desirably has an annular shape, but it need not be specifically limited to an annular shape.

On the other hand, the partitioned upper portion of the floating body 1 is partially open at its side surface (that is, an opening 7), allowing seawater to enter and exit. The portion above the sea surface in the upper portion constitutes an air chamber 5. An air turbine 6 is mounted at the upper end opening of the floating body 1.

The reason why the above structure is employed is that, according to the present invention, the floating body 1 is installed in the sea so as to leave a predetermined space in the air chamber 5 resulting from equilibrium between the buoyancy F1 and the weight F2. In addition, in the depth of the sea where water is almost stationary without being affected by surface waves when the water surface moves vertically in accordance with the vertical motion of the waves, the annular flange portion 4 is provided to extend radially from the lowermost end portion of the floating body 1 in order to maximize the resistance of water when the floating body 1 is moved up and down by the difference between the buoyancy F1 and the weight F2 On the contrary around the surface of the sea, a cylindrical shape having a smooth surface is selected in order to minimize a force that causes the floating body 1 to move vertically due to waves.

Thus, when the surface of the sea fluctuates vertically force applied vertically to the floating body 1 is substantially suppressed and the floating body tends to maintain the current position due to inertial force. In addition the opening 7 for seawater is provided at the upper portion of the floating body 1 with a sufficient opening area so as to substantially remove the resistance of seawater coming in and going out. Therefore, the surface of the sea inside the air chamber 5 fluctuates in accordance with the vertical motion of the surface of the sea outside This fluctuation establishes air exchange between the air chamber 5 of the floating body 1 and the ambient space. It is desirable that energy loss given by the seawater passing through the opening 7 is smaller and for this reason, it is effective that the opening area is larger. However, in general it is desirable to determine the opening area in consideration of the balance with the horizontal cross-sectional area of the air chamber 5. For example, the opening area of the opening 7 is preferably 25 percent or above of the horizontal cross-sectional area of the air chamber5.

On the other hand the air turbine 6 is installed above the air chamber 5. The air turbine 6 is of a type that is rotationally driven in one direction in any event when air flows out from the air chamber 5 and when air flows into the air chamber 5. Note that an existing structure, for example such as a wells turbine may be employed as the air turbine 6.

By the provision of the generator that is rotationally driven by the air turbine 6, power generation is performed so that the air turbine 6 is rotationally driven in one direction due to wave energy that is present in both the upward motion and downward motion of waves, thus making it possible to efficiently convert wave energy into electric energy.

Here, because the air turbine 6 is a resistance to impede the flow of air, there occurs a difference in pressure of atmosphere between the inside and outside of the air chamber 5. This causes a difference in water level between the inside and outside of the air chamber 5. Hence, buoyancy resulting from the difference in water level will be applied to the floating body 1.

Thus, the vertical motion of the floating body 1 may be analyzed as a forced vibration phenomenon, where waves on the surface of the sea serve as a vibrator.

Figure 4:
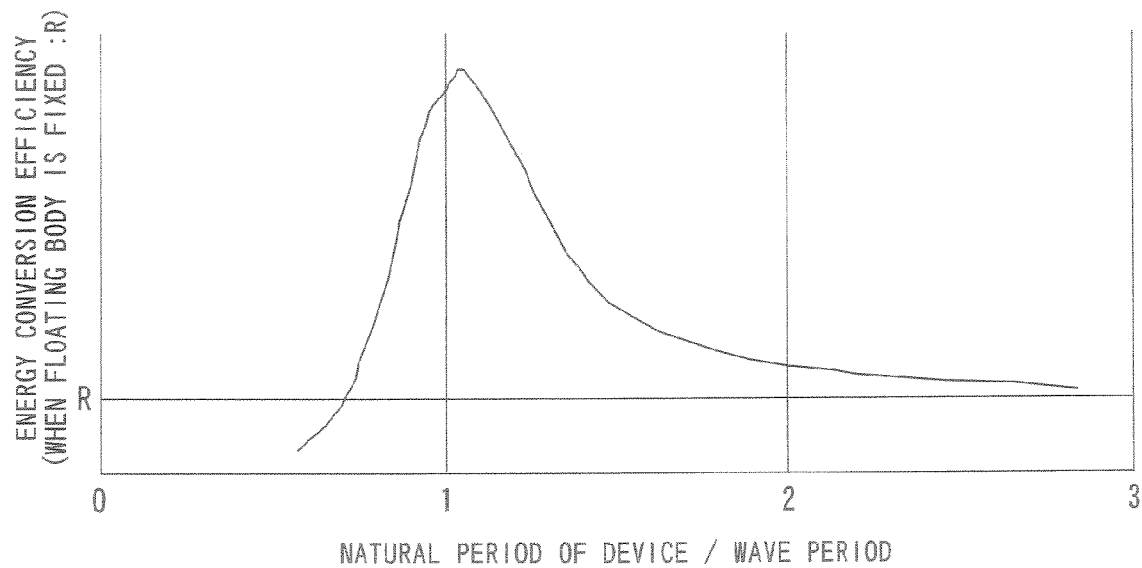
FIG. 4 is a graph showing a relation between the conversion efficiency of wave energy and the natural period of the device.

FIG. 4 is a graph showing a change of the conversion efficiency of wave energy with respect to the ratio of the wave period to the natural period of the vertical motion of the floating body 1. The natural period is determined by the horizontal cross-sectional area of the cylindrical floating body 1 near the surface of the sea and the mass of overall device including the floating body 1. The conversion efficiency of wave energy is shown in the graph relative to the reference value R. The reference value R is the conversion efficiency of wave energy, for example, in a state where the floating body is fixed on the sea floor.

The graph proves that, when the natural period of vertical motion of the floating body is set to be 0.8 to 1.6 times the wave period, particularly high conversion efficiency of wave energy may be obtained. The natural period T of vertical motion of the floating body may be obtained from the following equation.

$$T = 2\pi \times SQR(M/(S \times \rho \times g)) \tag{Equation}$$

where "T" is the natural period (s) of vertical motion of the floating body, "S" is the horizontal cross-section area (m$^2$) of the upper half portion of the cylindrical floating body "M" is the overall mass (kg) including seawater inside the present device, "π" is the ratio of the circumference of a circle to its diameter, "ρ" is the density (kg/m$^3$) of seawater, "g" is the acceleration due to gravity, and "SQR(x)" is the function that calculates a square root of x.

In this case, the seawater inside the power generating equipment also performs vertical motion together with the floating body 1, so that the mass may be changed by adjusting the length of the floating body 1. Thus, according to the present invention, because it is relatively easy to be able to set the natural period, it is possible to respond to a annual average wave period of the area where the present device is anchored.

Figure 5:
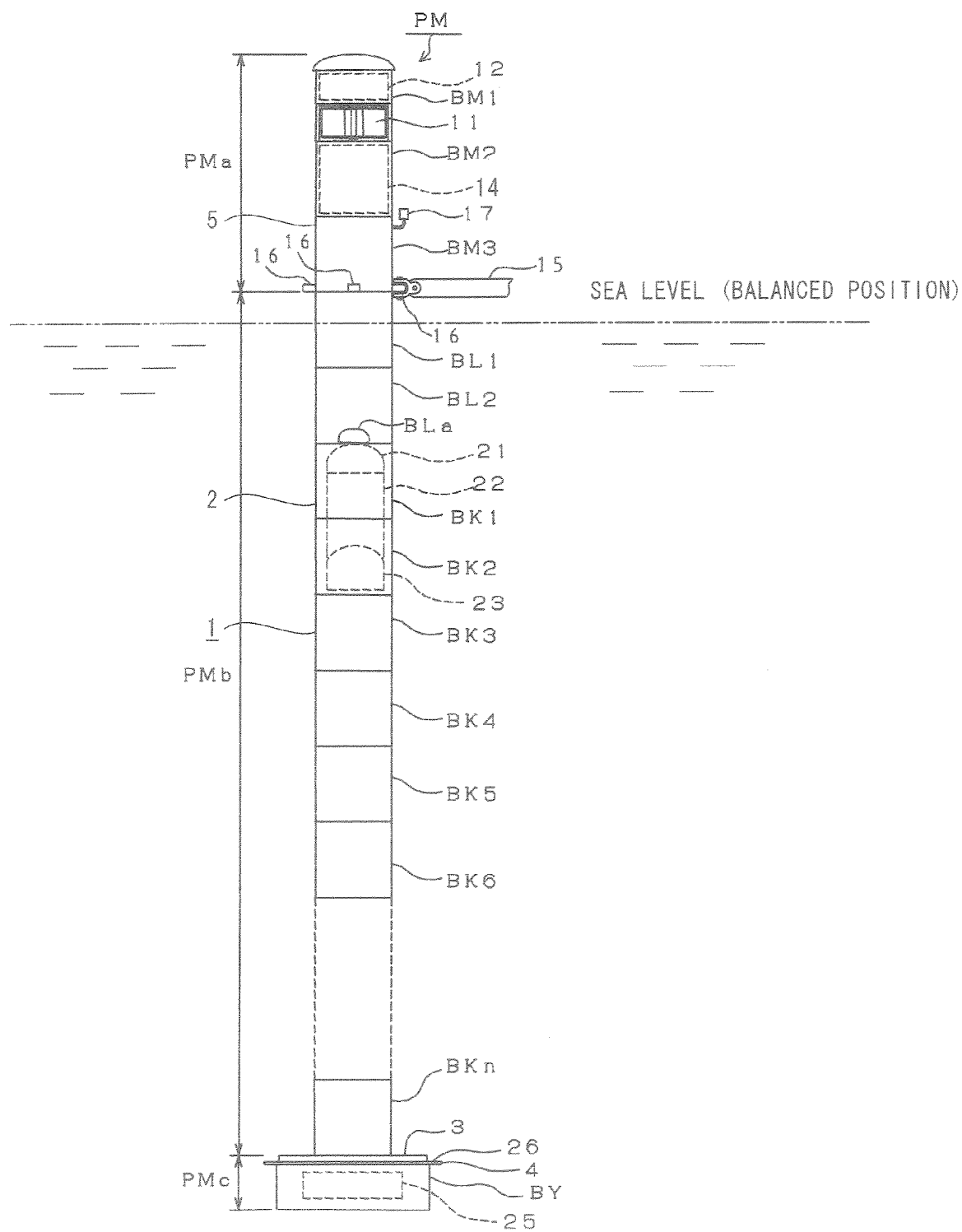
FIG. 5 is a schematic structural view that shows one example of the wave activated power generation device according to the embodiment of the present invention.

FIG. 5 schematically shows an ex ample of the wave activated power generation device PM according to the embodiment of the present invention. The wave activated power generation device PM is installed in the sea, and includes the upper portion PMa that appears above the surface of the sea with the above described floating body 1 as a main component, the intermediate portion PMb that is submerged in the sea below the surface of the sea, ad the lower portion PMc that is provided with the ballast 3, or the like, provided at the flange portion 4.

The upper portion PMa is constituted of cylindrical members BM1, BM2, BM3, which form the body of the floating body 1. The uppermost cylindrical member BM1 accommodates a wind turbine 11 (a wind turbine portion) and watertightly accommodates a generator 12 that is rotationally driven by the wind turbine and its related components (a control portion). The cylindrical member BM2 accommodates the air turbine 6 and a power generation unit 14 constituted of a generator 13 that is rotationally driven by the air turbine 6 (wave power generating portion). The cylindrical member BM3 is provided on its outer peripheral surface with a plurality of link portions 16 for linking with link members 15 to be coupled to another wave activated power generation device PM, or the like in order to construct a wave activated power generation plant (which will be described later). In addition, a portion of the floating body forming the air chamber 5 is provided with a regulating valve 17, thus relieving the degree of vacuum in the air chamber 5. The detailed structure of the upper portion PMa will be described later with reference to FIG. 6.

On the other hand, the intermediate portion PMb (including the buoyancy adjusting portion) is constituted of cylindrical members BL1, BL2, BK1, BK2 to BKn, which for the body of the floating body 1. The cylindrical member BL1 is connected to the cylindrical member BM3 of the upper portion PMa of the floating body 1. The cylindrical member BL2 that is connected to the cylindrical member BL1 has a opening BLa for allowing seawater to enter and exit.

In addition, the cylindrical members BK1 to BKn each having the same shape are serially connected to the bottom of the cylindrical member BL2. A large-diameter cylindrical member BY for accommodating the components of the lower portion PMc is connected to the lowermost end cylindrical member BKn. The upper end face of the cylindrical member BY is closed and the inside of the cylindrical member BY is not in communication with the inside of the cylindrical member BKn. Thus, the inside of the cylindrical member BY forms an independent space.

Though it will be described later, the body of the floating body 1 is formed so that the cylindrical members BK1 to BKn each having the same diameter are connected in series as described above. However, these cylindrical members are made of plastic material so that cylindrical members having the same shape are easily manufactured by means of die forming Accordingly, by increasing or decreasing the number in which cylindrical members BK1 to BKn are connected, the longitudinal size of the intermediate portion PMb may be determined thus making it possible to set the length of the floating body 1.

Furthermore, the wave activated power generation device according to the present invention generates electricity as a primary product and also generates hydrogen as a secondary product. The cylindrical members BK1, BK2 are provided with a first hydrogen tank 21, a second hydrogen tank 22, and the like, for storing generated hydrogen gas, in addition to the above buoyancy control chamber 2. The buoyancy control chamber 2 is open at its lower end face and is capable of adjusting a space that excludes seawater.

Thus, when the first hydrogen tank 21 and the second hydrogen tank 22 are provided, the magnitude of buoyancy F1 is determined by the total capacity of the first hydrogen tank 21 and second hydrogen tank 22 and the volume of space in the buoyancy control chamber 2. Note that, because the total capacity of the first hydrogen tank 21 and second hydrogen tank 22 is fixed, the magnitude of the buoyancy F1 may be adjusted by the volume of space in the buoyancy control chamber 2.

The cylindrical members BK1 to BKn each have a small opening for allowing seawater to flow thereinto in order to fill the inside with seawater. The opening initially serves as a air vent when the power device is installed on the sea, and, during operation, serves to balance the pressure by allowing water to communicate between the inside and outside of the cylindrical body. The openings each have a minimum diameter (BLa>>BKn).

The cylindrical member BY of the lower portion PMc accommodates an electrolyzer that generates hydrogen, oxygen or the like, by applying electrolysis to seawater by means of electric power generated by the generators 12, 13. The inside of the cylindrical member BY forms a space (a hydrogen gas storage portion) for storing hydrogen gas that is generated by the electrolyzer 25.

The annular ballast 3 is mounted on the upper end portion of the cylindrical member BY, while the annular flange portion 4 is provided at the upper end portion of the cylindrical member BY. The outside diameter of the ballast 3 is lager than that of the floating body 1. A grip member 26 is provided on the outer peripheral surface.

Then, the cylindrical member BM3, the cylindrical member BL1, the cylindrical member BL2, the cylindrical members BK1 to BKn, and the cylindrical member By are fixedly connected by means of a plurality of hollow through-bolts (which will be described later).

Figure 6:
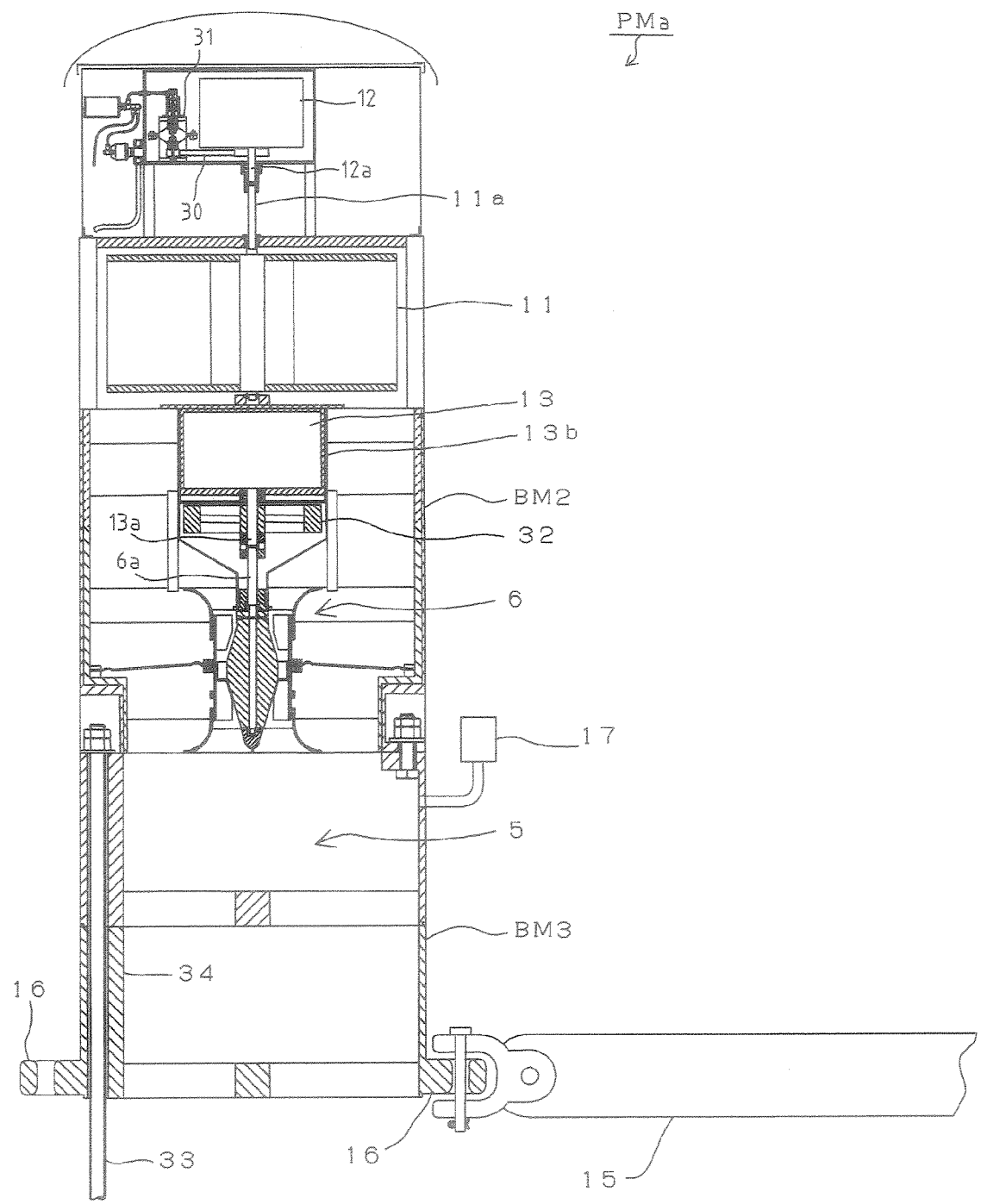
FIG. 6 is a enlarged schematic cross-sectional view that shows a specific example of the structure of upper portion of the wave activated power generation device.

FIG. 6 shows a specific example of the upper portion PMa.

In FIG. 6, for example, a savonius four-blade type may be employed as the wind turbine 11, whose shaft 11a is coupled to the drive shaft 12a of the generator 12. In addition, the rotary shaft of a relief valve device 31 is coupled to the drive shaft 12a via a belt drive mechanism 30. Note that hydrogen gas will be led into the casings of the generator 12 and relief valve device 31 (which will be described later).

The drive shaft 13a of the generator 13 is coupled to the rotary shaft 6a of the air turbine 6, while a flywheel 32 is connected to the rotary shaft 6a of the air turbine 6, thus attempting to stabilize the torque. The space below the air turbine 6 found the air chamber 5. The regulating valve 17 mounted to the air chamber 5, when the air pressure in the air chamber 5 is lower than a certain value, opens the air chamber 5 to increase the air pressure in the air chamber 5. The generator 13 is accommodated in a casing 13b that is filled with hydrogen gas.

The hollow through-bolts 33 are inserted through insertion portions 34 for fixedly connecting the cylindrical member BM3, the cylindrical member BL1, the cylindrical member BL2, the cylindrical members BK1 to BKn, and the cylindrical member BY. The insertion portions 34 are provided immediately inside the outer wall of the cylindrical member BM3, the cylindrical members BL1, BL2, the cylindrical members BK1 to BKn and the cylindrical member BY. The hollow portion of each hollow through-bolt 33 serves as a passage that contains a power line (not shown) for supplying electric power from the generators 12, 13 to the electrolyzer 25 and a hydrogen gas transport tube (not shown) for leading hydrogen gas generated by the electrolyzer 25 to a collecting tank.

FIG. 7 shows one example of the air turbine 6.

In the drawling a rotary body 6b is coupled to the rotary shaft 6a. Rotor blades 6c are provided around the center portion of the rotary body 60b Upper side stator blades 6d and lower side stator blades 6e are provided on the inside of a casing 6f. A lower side bellmouth 6g and an upper side bellmouth 6h are provided on the outside of the casing 6f, respectively. A diaphragm 6i supports the casing 6f so as to be movable vertically, while it normally urges the casing 6f upwardly against gravity. Alternatively, the structure that the casing 6f is vertically movable by means of a piston in place of a diaphragm may be employed (which will be described later with reference to FIG. 7B).

Figure 8:
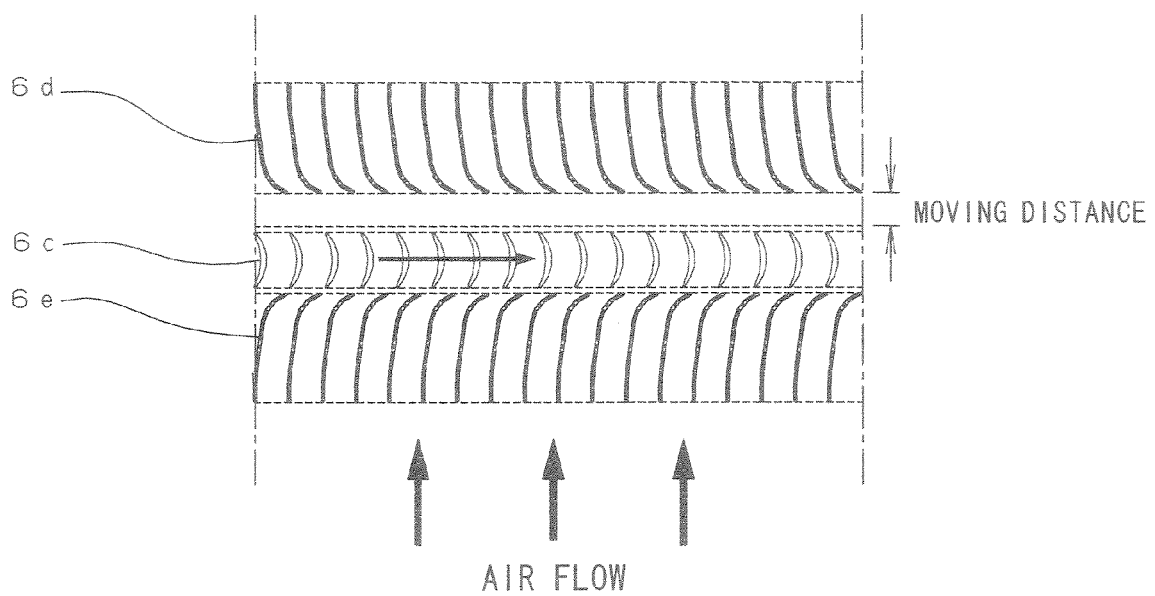
FIG. 8 is a expansion plan along a cylindrical plane, showing stator blades (nozzles) and cross-sections of rotor blades.
Figure 9:
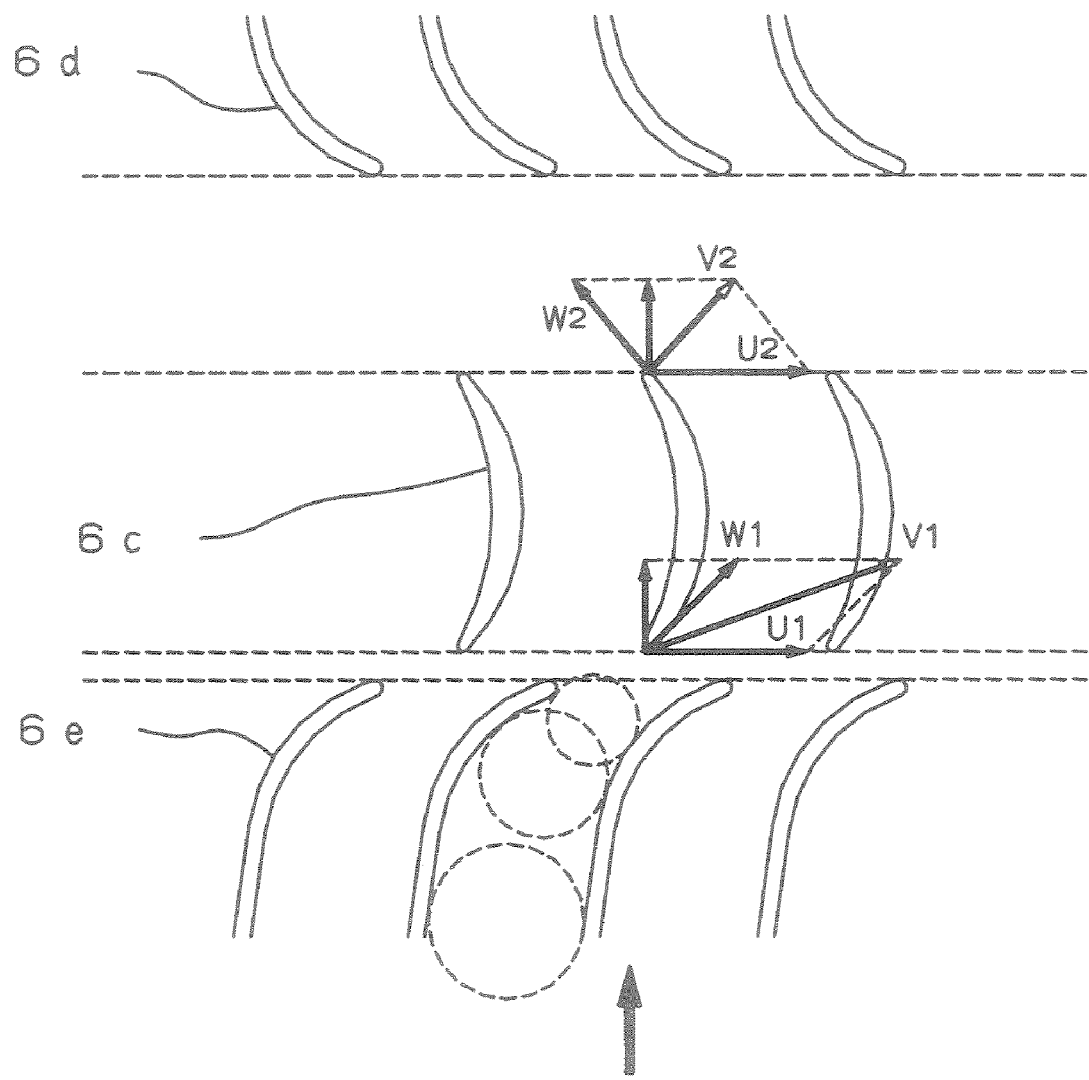
FIG. 9 is an explanatory view of velocity triangles at the inlet and outlet of a impeller (a rotor blade).

When air flows from the inside of the air chamber 5 toward the outside thereof, the casing 6f is moved upward by the diaphragm 6i and the lower side stator blades (nozzles) 6e are located in proximity to the rotor blades (impellers) 6c. Thus, the air is rectified by the stator blades 6e and accelerated to a flow velocity having a component of rotational direction of the rotor blades 6c to drive the rotor blades 6c. This operation will be described specifically with reference to FIGS. 8 and 9. FIG. 8 is an expansion plan along a cylindrical plane defined at the center of the flow passage of the rotor blades 6c and the stator blades 6e, 6d, showing the cross-section of the blades, FIG. 9 is a partially enlarged view illustrating velocity triangles at the inlet and outlet end of the rotor blades 6c together. In FIG. 9, the reference signs U, V, W denote peripheral velocity, absolute velocity, and relative velocity, respectively. The suffix 1 and 2 denote the inlet and outlet end of the rotor blades, respectively. As is apparent from FIG. 9, the absolute velocity V2 at the outlet end of each rotor blade travels in the direction to collide substantially perpendicularly with the blade of each stator blade 6d located on the outlet side and thereby impedes the flow, causing deterioration of performance. According to the present invention, the stator blades 6d located on the outlet side are located a distance from the rotor blades 6c to reduce deterioration of performance due to this factor. In addition, deterioration of performance is further reduced by guiding the flow from the rotor blades 6c to the flow passage, which is formed spaced apart between the stator blades 6d and the rotary body 6b.

On the other hand, when air flows into the inside of the air chamber 5 from the outside thereof the casing 6f is moved downwardly by the diaphragm 6i. This time, the other way around, the upper side stator blades 6d are located in proximity to the rotor blades 6c and the lower side stator blades 6e are located a distance from the rotor blades 6c. However, in this case as well, the air rectified by the stator blades 6d drives the rotor blades 6c in the same direction.

As described above, when the surface of the sea in the air chamber 5 rises to compress the air inside the air chamber 5 and the air thereby flows out from the air chamber 5, and when the surface of the sea in the air chamber 5 falls to decrease the air pressure inside the air chamber 5 and the air thereby flows into the air chamber 5 from the outside, in either cases, the rotor blades 6c of the air turbine 6 are efficiently driven in one rotational direction, making the generator 13 to be appropriately driven through the rotary body 6b and the rotary shaft 6a.

Note that, in a state where waves are excessively high beyond assumption, when the flow velocity of air that flows through the air turbine 6 becomes nearly equal to the sound velocity, the mass of air that flows into the air chamber 5 tends to be smaller than the mass of air discharged therefrom. Thus, the amount of air inside gradually reduces, resulting in a state where the equilibrium position on the surface of the sea according to the design of the device is shifted upwardly. Hence, the function is deteriorated.

To avoid such an occasion, the pressure regulating valve 17 is provided for relieving the degree of vacuum in the air chamber 5, so that the working pressure is adjustable and is set to an optimum value in consideration of conditions of the area where the wave activated power generation device PM is anchored.

In addition, because the regulating valve 17 may be adjusted to the maximum to remove the pressure difference between the inside and outside of the air chamber 5, it may be conveniently used when maintenance is performed by stopping the rotation of the air turbine 6 or during installation adjustment.

Figure 10:
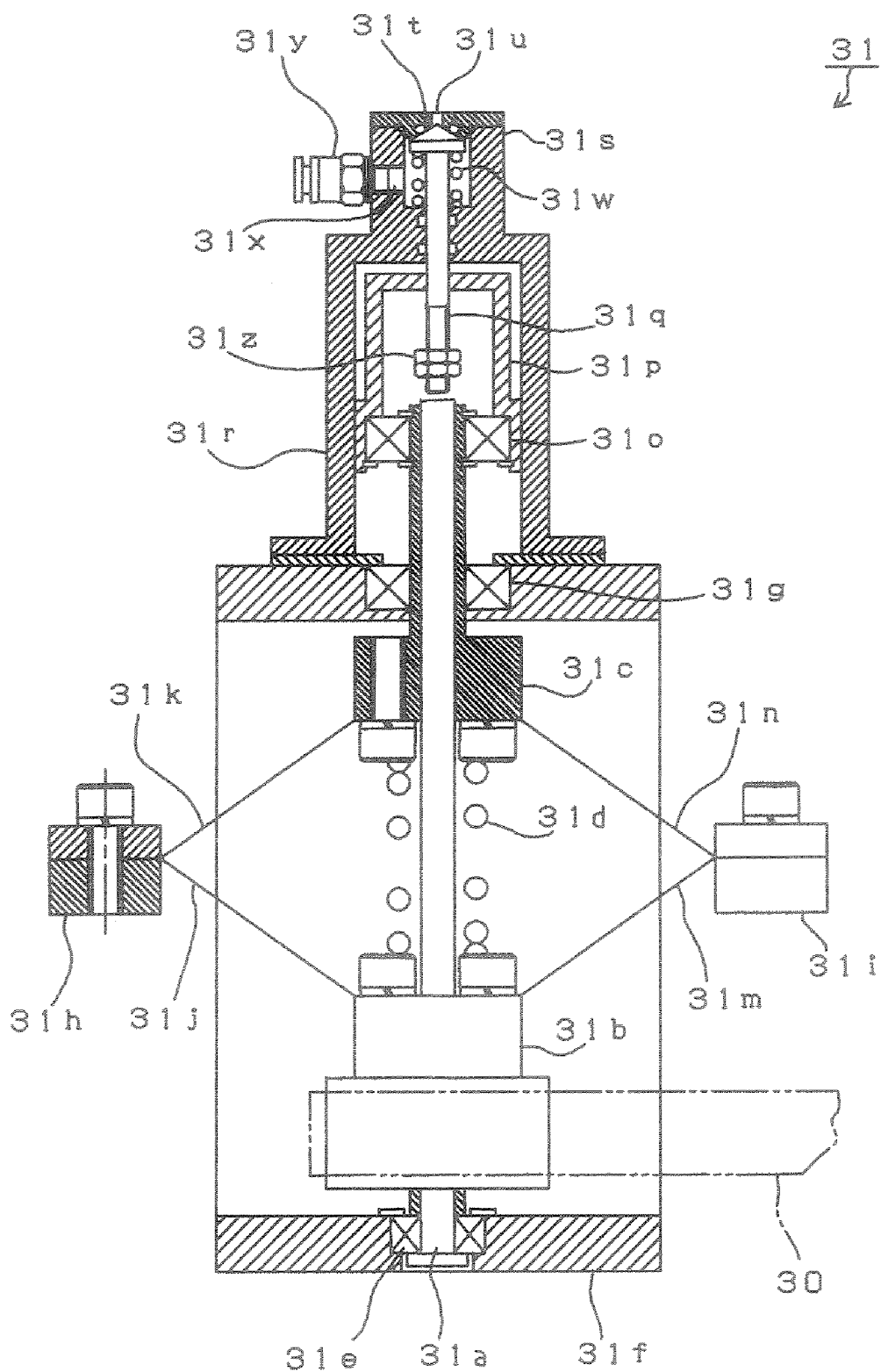
FIG. 10 is a partially schematic cross-sectional view that shows one example of a relief valve device that is provided at a control portion in the embodiment according to the present invention.

FIG. 10 shows one example of the relief valve device 31. The relief valve device 31 performs a relief operation when the rotational speed of the wind turbine 11 exceeds a value corresponding to a predetermined wind force.

In the relief valve device 31, the inside of a housing 31f is the same structure as a known generally used centrifugal speed governor in which a sleeve 31c moves up and down as it rotates in accordance with the rotational speed of a shaft 31a.

The top portion of the sleeve 31c is connected to a slide block 31p through a bearing 31o and only the vertical motion is transmitted.

The outer case 31r of the relief valve is fixed on the housing 31f of the centrifugal speed governor and a valve 31t adjusts the opening of a hole 31u by the urging force of a compression spring 31w.

The valve 31t extends through the slide block 31p that is assembled to the outer case 31r, and is easily connected by a double nut 31z which is the state shown in FIG. 10).

Thus, as the rotational speed of the shaft 31a increases, the slide block 31p begins to go downwardly and finally contacts the double nut 31z of the valve 31t. By pushing it downwardly, the valve 31t opens the hole 31u and a fluid filled in the valve flows out (relief state) Then, the position of the double nut 31z is adjusted so as to correspond to the wind force at which the device is evacuated (which will be described later).

Figure 11:
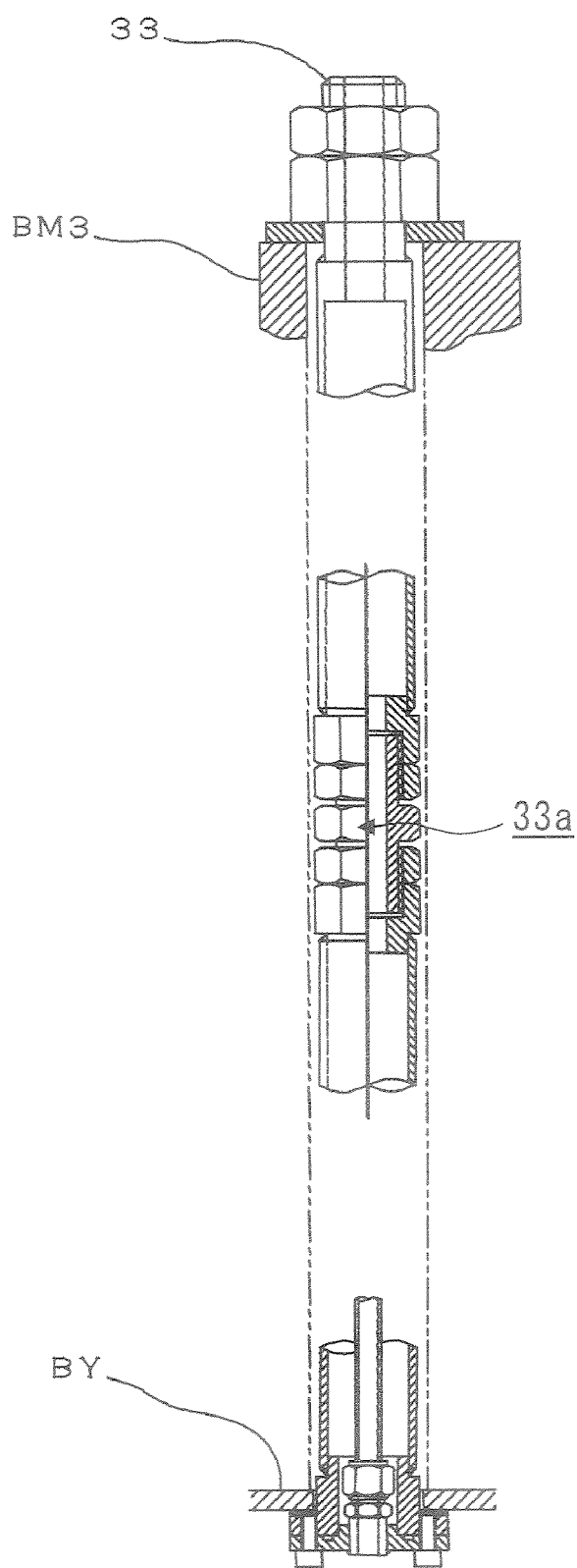
FIG. 11 is a cross-sectional view of a hollow through-bolt.

FIG. 11 shows an example structure of each hollow through-bolt 33 shown in FIG. 6.

Each hollow through-bolt 33 is formed to have an appropriate length, and the plurality of bolts are connected at connecting portions 33a. Because the body of the floating body 1 is so formed that the cylindrical members BK2 to BKn each having the same shape are connected in series and may be adjusted in number, the number of connecting portions 33a depends upon the connected overall length.

Note that, in the foregoing description, the floating body 1 is desirably made of plastic. In the preferred embodiment of the present invention, it is possible and desirable to form the components of the wave activated power generation device PM using plastic.

In other words, the components of the wave activated power generation device of the above described embodiment, such as the generators, the turbine shaft, the ballast, the diaphragm, the through-bolts, and almost all the control components with some exceptions, may be formed of plastic material. The plastic material is roughly classified as the following four types, but it is not limited to these types. They may be freely utilized depending on conditions.

Engineering plastic rotary blade of air turbine, nozzle, rotary blade of wind turbine, or the like.

FRP (fiber reinforce plastic): portion of cylindrical members that mainly receive wave force, positioned upwardly from the buoyancy control chamber including itself.

Normal plastic: cylindrical members of the body of the upper portion, inner structural portion (portion that does not receive wave force), or the like.

Waste plastic: cylindrical members (portion that does not mainly receive wave force), or the like, positioned below the buoyancy control chamber.

By using plastic material in this manner, the weight is reduced. In addition, because it is particularly suitable for die forming, it is advantageous in mass production and, in comparison to metal it is advantageous in anti-corrosion. Furthermore, it is advantageous in that, because waste plastic may be positively used for portions that are not affected by wave force, it is able to contribute to reduction of costs and waste pollution.

As described above, according to the present invention, because the cylindrical portion of the floating body 1 may be easily adjusted in length by adjusting the number of the plurality of components each having the same shape, it is particularly desirable to manufacture by means of die forming using plastic.

Figure 12:
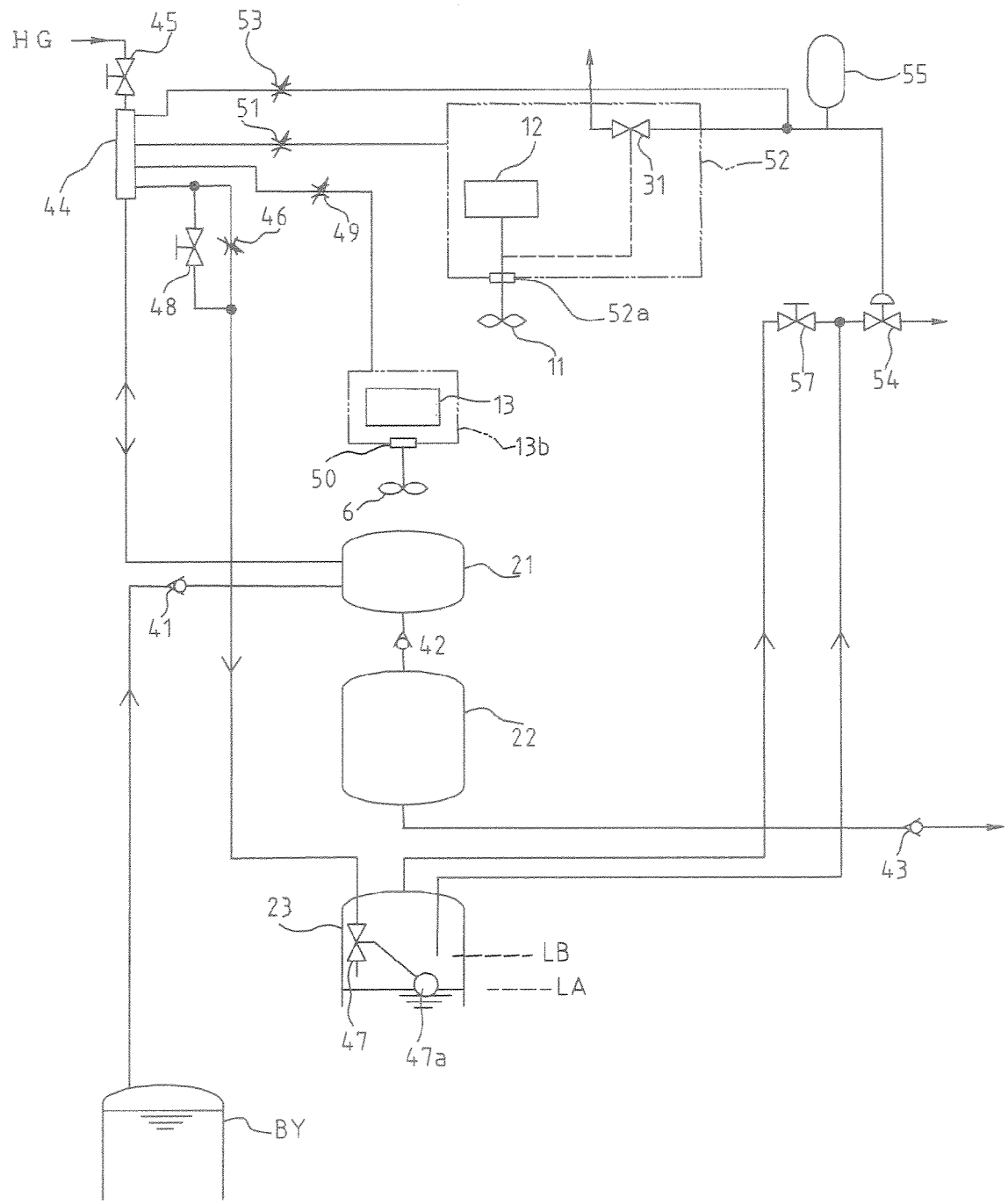
FIG. 12 is a block diagram that shows one example of a hydrogen gas system of the wave activated power generation device according to the embodiment of the present invention.

FIG. 12 shows one example of a hydrogen gas system according to the embodiment of the wave activated power generation device of the present invention.

In FIG. 12, hydrogen gas generated by the electrotyper 25 is stored in the hydrogen gas storage portion that is provided at the cylindrical member BY and, after that, is led to the first tank 21 in the floating body 1 through a check valve 41. The hydrogen gas stored in the first tank 21 is then led to the second tank 22 through a check valve 42. The hydrogen gas stored in the second tank 22 is led to a collecting tank through a check valve 43.

This system is a system for generation and collection of hydrogen gas

The first tank 21 is connected to a branch unit 44. Hydrogen gas HG is introduced into the branch unit 44 via a manual valve 45. The branch unit 44 is also connected to a float valve 47 of the buoyancy control chamber 23 via a throttle valve 45 The manual valve 48 is connected to bypass the throttle valve 46.

The branch unit 44 is also connected to the casing 13*b* of the generator 13 via a throttle valve 49 A shaft seal 50 is provided in the casing 13*b* to seal the shaft 13*a* of the generator 13.

In addition, the branch unit 44 is connected to a casing 52 of the relief valve 31 and generator 12 via a throttle valve 51. A shaft seal 50 is provided in the casing 52 to seal the shaft 12*a* of the generator 12.

Furthermore, the branch unit 44 is connected to the pressure regulating portion of a pressure regulating valve 54 via a throttle valve 53. A pressure accumulator 55 and the relief valve device 31 are connected to the connection between the throttle valve 53 and the pressure regulating portion of the pressure regulating valve 54.

The pressure regulating valve 54 is, in the buoyancy control chamber 2, to connect a conduit 56 to the outside. The conduit 56 is configured to be set at water level LB for specifying a submerged state, which will be described later. The pressure regulating valve 54 is also connected to a manual valve 57 that is in communication with the uppermost level of the buoyancy control chamber 2.

Note that the above valve mechanisms, the generator 12, the relief valve device 31, or the like, are provided watertightly as the control portion on a board 30 of the uppermost portion of the floating body, as shown in FIG. 6. Including the control portion, the upper section above the wind turbine portion serves as a control chamber.

The wave activated power generation device PM having the above described configuration according to the present invention operates as described below Upon starting operation of the wave activated power generation device PM, first, a tow line is tied to the grip member 26 provided on the portion of the ballast 3 and is moved with a towing boat to locate the wave activated power generation device PM at an appropriate position on the surface of the sea. Then, the manual valve 45 is opened to introduce hydrogen gas HG into the device.

Thus, hydrogen gas is then sent to the components through the branch unit 44 For example, hydrogen gas that has been sent to the first tank 21 is sent to the second tank 22 via the check valve 42. Hence, the air that is stored in the first tank 21 and the second tank 22 is replaced by hydrogen gas.

In addition, by opening the manual valve 48 that bypasses the throttle valve 46, hydrogen gas that has been sent to the float valve 47 of the buoyancy control chamber 23 is stored in the buoyancy control chamber 23, causing the space of the buoyancy control chamber 23 to increase. This increases the buoyancy F1 of the floating body 1. Then, as the float 47*a* of the float valve 47 reaches a normal operation water level LA that is set in advance, the float valve 47 is closed. Thus, the wave activated power generation device PM is in a state where it floats in a normal operation state, as shown in the left side of FIG. 13.

Hydrogen gas that has been sent to the casing 13*b* via the throttle valve 49 fills the space around the generator 13. Thus, the casing 13*b* of the generator 13 is pre-pressurized by the hydrogen gas thereby preventing the entry of seawater inside the casing 13*b*.

In addition, hydrogen gas that has been sent to the casing 52 via the throttle valve 51 fills the space around the generator 12 and the relief valve device 31. Thus, the casing 52 is pre-pressurized by the hydrogen gas, thereby preventing the entry of seawater inside the casing 52.

Hydrogen gas that is supplied to the pressure regulating portion of the pressure regulating valve 54 via the throttle valve 53 is stored in the pressure accumulator 55 and applies a certain pressure When this pressure is larger than a predetermined value, the pressure regulating valve 54 turns off, Thus, the conduit 56 of the buoyancy control chamber 23 is shut from the outside, and a buoyancy control by the float valve 47 is enabled in the buoyancy control chamber 23. Meanwhile, the manual valve 57 is closed in the normal operation state.

In this manner, when the wave activated power generation device PM is floating in a normal operation state, the air turbine 6 is rotated by the vertical motion of waves. Thus, the generator 13 is driven and electric power generated by the generator 13 is supplied to the electrolyzer 25.

While at the same time, the wind turbine 11 is rotated by wind blowing above the sea, and the generator 12 is thereby driven. Electric power generated by the generator 12 is also supplied to the electrolyzer 25.

In this manner, electric power generated by the generators 12, 13 is supplied to the electrolyzer 25, and the electrolyzer 25 operates to electrolyze seawater. The thus obtained hydrogen gas is stored in the hydrogen gas storage portion of the cylindrical member BY and is sent from the hydrogen gas storage portion to the first tank 21.

Hydrogen gas that has been sent to the first tank 21 is sent to the second tank 22 via the check valve 42 and is further sent to the collecting tank via the check valve 43.

Because the hydrogen gas storage portion is located at the lowermost portion of the floating body 1 of the wave activated power generation device PM and receives water pressure at the level of depth, it has a pressure of approximately 2 (kg gage pressure), for example. Therefore, without any exclusive pressure feed mechanism, hydrogen gas that has been generated by the electrolyzer 25 is supplied smoothly to the collecting tank. In this state, for example, it is preferable that the check valves 41, 42, 43 each have a set pressure of approximately 1.5 atmospheric pressure.

Hydrogen gas stored in the first tank 21 is sent to the branch unit 44 For example, even when hydrogen stored in the buoyancy control chamber 23 is relieved, hydrogen gas that is supplied from the first tank 21 is sent to the buoyancy control chamber 23 when the float 47*a* rises to open the float valve 47. Thus, the water surface in the buoyancy control chamber 23 falls again and the float valve 47 is closed when the float 47*a* is moved to the predetermined water level LA.

In this manner, because of the operation of the buoyancy control chamber 23, the wave activated power generation device PM keeps a state where it floats in the normal operation state.

In the case where wind velocity on the sea is large, waves are high and it is dangerous to operate the wave activated power generation device PM due to heavy weather, the rotational speed of the wind turbine 11 becomes extremely high and the relief valve device 31 performs a relief operation, as described above.

Thus, pressure in the pressure regulating portion of the pressure regulating valve 54 tends to decrease. However, at this time, hydrogen pressure accumulated in the pressure accumulator 55 maintains the pressure applied to the pressure regulating portion.

Here, when heavy weather continues and the relief operation of the relief valve device 31 continues for a long time, hydrogen pressure accumulated in the pressure accumulator 55 also decreases. Thus, the pressure applied to the pressure regulating portion becomes lower than the set value.

Figure 13:
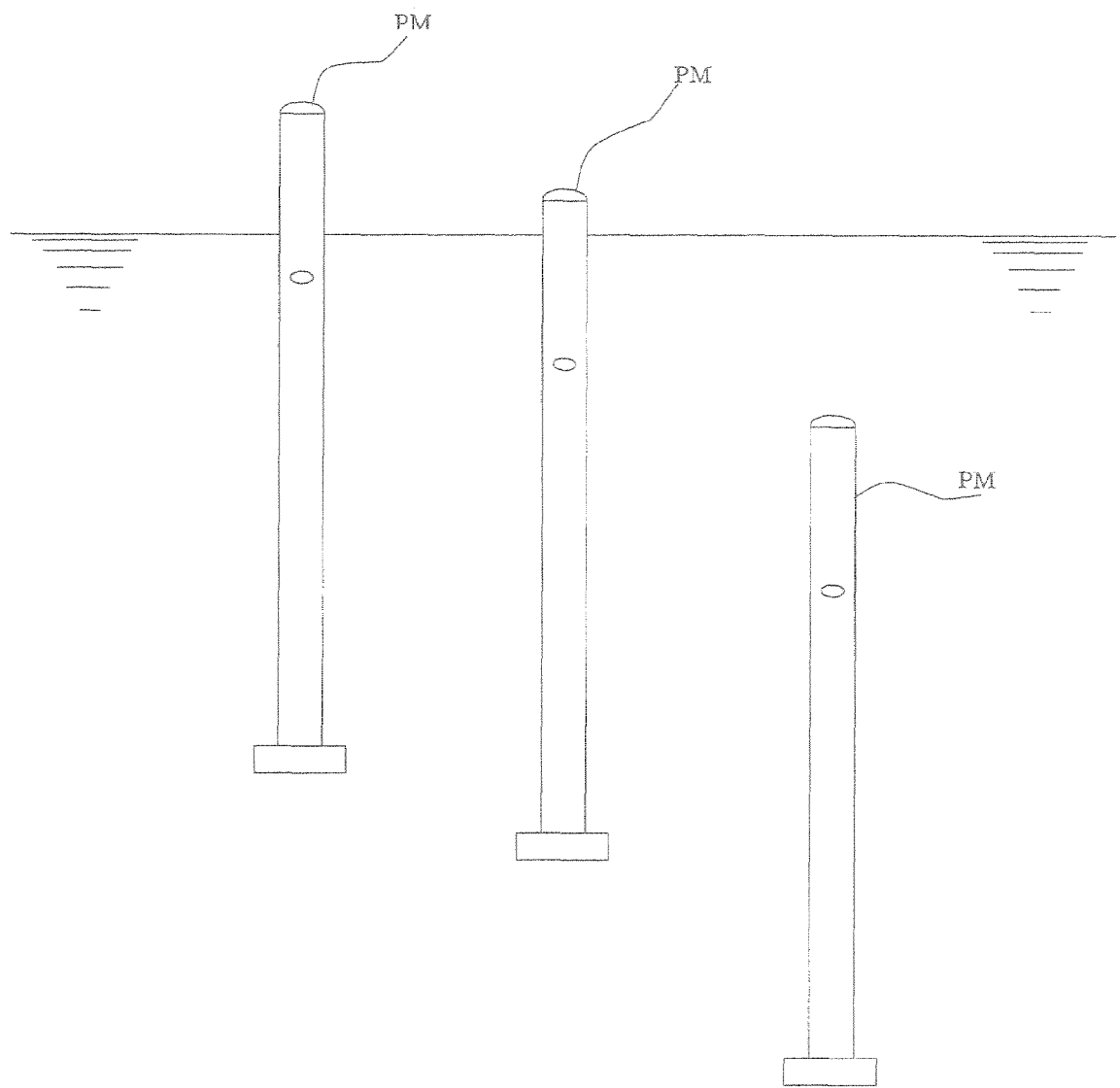
FIG. 13 is a schematic view that illustrates positions under various operation conditions of the wave activated power generation device.

This makes the pressure regulating valve 54 open, and the conduit 56 of the buoyancy control chamber 23 is made in communication with the outside. Thus, the water level in the buoyancy control chamber 23 rises to the submerged state water level LB, and, as shown in the middle of FIG. 13, the wave activated power generation device PM is submerged, leaving the control chamber above the wind turbine 11.

In this state, the air turbine 6 and the wind turbine 11 do not rotate and thereby electric generation of the generator 12 and generator 13 is stopped. However, the first tank 21 has a sufficient capacity to fill the buoyancy control chamber 23 and, in addition, to be able to supply to the casings 52, 13*b* of the generators 12, 13 for a long time, thus preventing the entry of seawater inside the casings 52, 13*b*.

At the same time with the stop of rotation of the wind turbine 11, the relief valve 31 is closed, and hydrogen gas is sent from the first tank 21 through the branch unit 44 and the throttle valve 53 to the pressure accumulator 55 and the driving portion of the pressure regulating valve 54 to start increasing pressure. However, because the throttle valve 53 is adjusted to a low flow rate, it takes time to close the pressure regulating valve 54.

In this state, hydrogen gas is supplied from the first tank 21 through the branch unit 44, the throttle valve 46 and the float valve 47 to the buoyancy control chamber 23. However, the pressure regulating valve 54 is opened, so that the water level inside the buoyancy control chamber 23 remains at the water level LB.

In this manner, once submerged in the water, the state where the wind turbine portion and the portions below the wind turbine portion are submerged, as shown in the middle of FIG. 13, is maintained for a certain period of time.

On the other hand as the pressure of hydrogen gas applied to the control portion of the pressure regulating valve 54 increases and thereby the pressure regulating valve 54 is closed, pressure in the buoyancy control chamber 23 gradually increases. Accordingly, the water level in the buoyancy control chamber 23 falls, and the wave activated power generation device PM gradually rises.

As the water level in the buoyancy control chamber 23 reaches the reference water level LA, the float valve 47 is closed. After that, it maintains the normal operation state as in the case described above.

The amount of time that elapses until the rising of the wave activated power generation device PM completes since it is submerged may be set by the amount of flow at the throttle valve 46. For example, the amount of time may be set to about six to twelve hours.

For example, in the case where a typhoon is coming and the weather is extremely heavy, the wave activated power generation device PM needs to be completely submerged into a safety position, as shown in the right side of FIG. 13.

In such a case, the manual valve 57 is opened in advance. Then, hydrogen gas stored in the buoyancy control chamber 23 is completely discharged, so that the wave activated power generation device PM continues to fall and thereby to be submerged. For example, by means of a rope, or the like, that is connected to a boat (which will be described later) that supports the collecting tank, the wave activated power generation device PM stops at a safety water level, as shown in the right side of FIG. 13. Alternatively, it may reach the sea floor depending on the depth of the installation sea area.

When floating is performed from this state, it takes the amount of time to float from the state where the wind turbine and the portions below the wind turbine are submerged in addition to the amount of time for which the water level in the buoyancy control chamber 23 falls from its ceiling to the water level LB. For example, it may be set to about 24 to 48 hours.

Opening and closing of the manual valve 57 can determine the depth to be submerged. The amount of time for which the submerged state is maintained depends on the flow rate at the throttle valve 46 and the throttle valve 53. Therefore, for example, when these valves are manipulated only during installation, or before or after the season of typhoon, additional adjustment work is not required.

When recovered from this emergency state, hydrogen gas is supplied from the outside through the manual valve 45 so as to float to the normal operation state.

As described above, according to the embodiment of the present invention, since hydrogen is generated by electrolysis in the depth of water, hydrogen having a pressure, in accordance with the depth, that is higher than the atmospheric pressure, may be collected into the tank above the sea.

In the air turbine that airways rotates in one direction regardless of the direction of reciprocating air flow, nozzles (stator blades) each having a guide blade are provided upstream of the impeller to generate air flow that has a component of rotational direction at the inlet of the blades of the impeller (rotor blades). Thus, perform ace may be improved. In this case, when the direction of air flow is inverted, the guide blades of the nozzles impede the flow at the outlet of the impeller. However, according to the present invention, a floating nozzle structure that is movable a certain distance in response to the direction of air flow is employed, so that the downstream side nozzles are spaced apart from the impeller (refer to FIG. 7). In addition, air flow that exits from the impeller is guided to the flow passage formed by the floating nozzle being moved, thus preventing deterioration of performance.

Figure 7A:
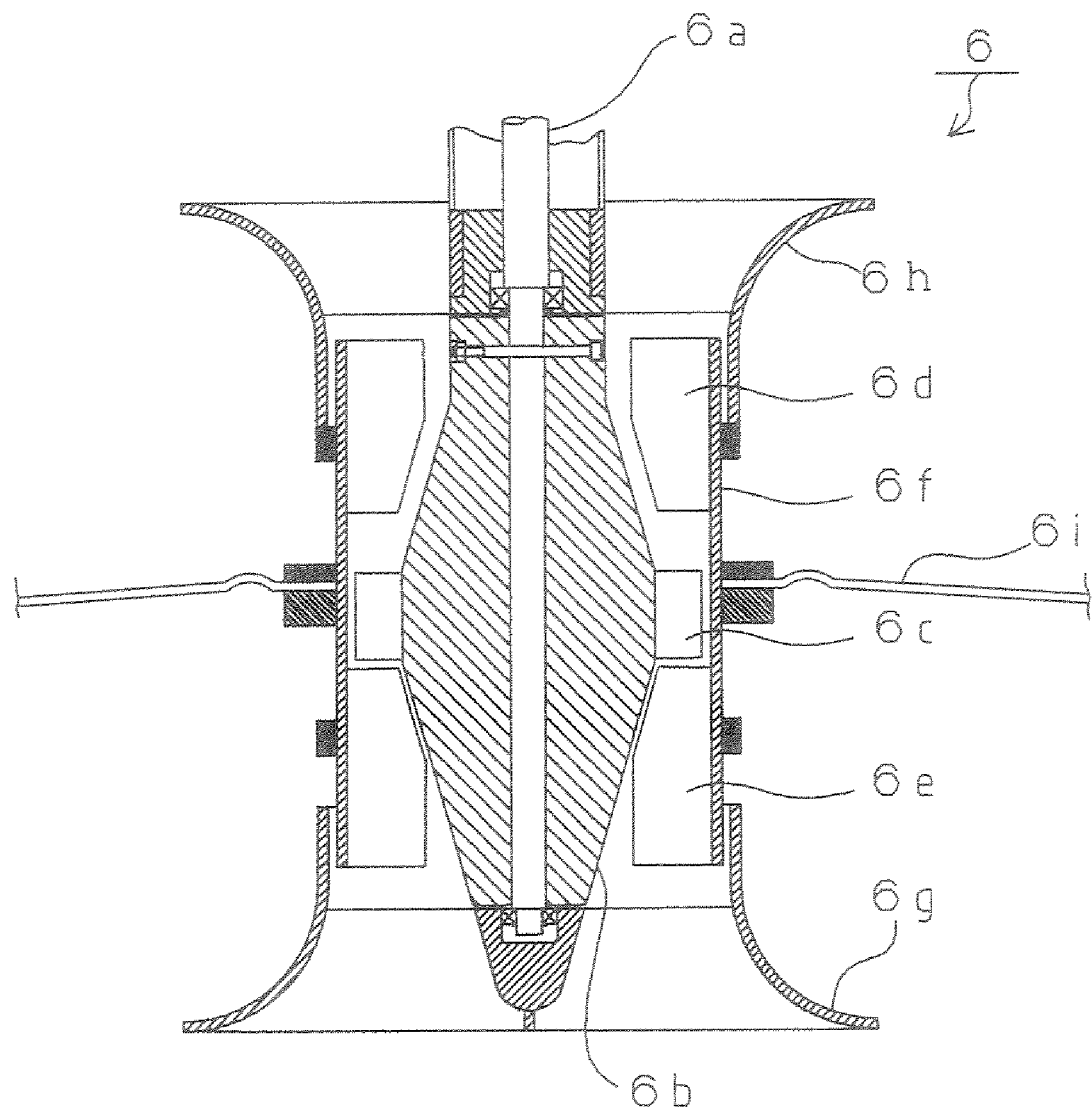
FIG. 7A is a schematic cross-sectional view that shows a example configuration of a air turbine in the structure of FIG. 6, showing the structure of a floating nozzle moving means for which a diaphragm is used

By utilizing the diaphragm, as shown in FIG. 7A, as means for moving the floating nozzle, the mechanism is remarkably simple while having a movable portion. Thus, workability of assembly and adjustment is improved.

Because the wind turbine is provided at the upper end portion of the cylindrical floating body, hydrogen may be generated when there is a wind while waves are gentle.

The floating body is divided into three sections, that is, the uppermost portion, the intermediate portion and the lowermost portion, and the intermediate portion is further divided by a predetermined length. Thus, the overall length of the floating body may be selected by changing the number in which members having the predetermined length are provided for the intermediate portion in accordance with the depth of the sea, annual average wave height, annual average wave period, and so forth. Therefore, according to the present invention, it is advantageous in that wide range of installation conditions is applicable without any change in the basic design and also advantageous in standardization and mass production.

In the foregoing description it is described that the diaphragm is used as means for moving the floating nozzle. However, in place of the diaphragm, a piston (a piston device) may be used to implement the same function and operation as in the case of the above embodiment. That is, FIG. 7B shows the configuration where the piston is used as means for moving the floating nozzle.

Figure 7B:
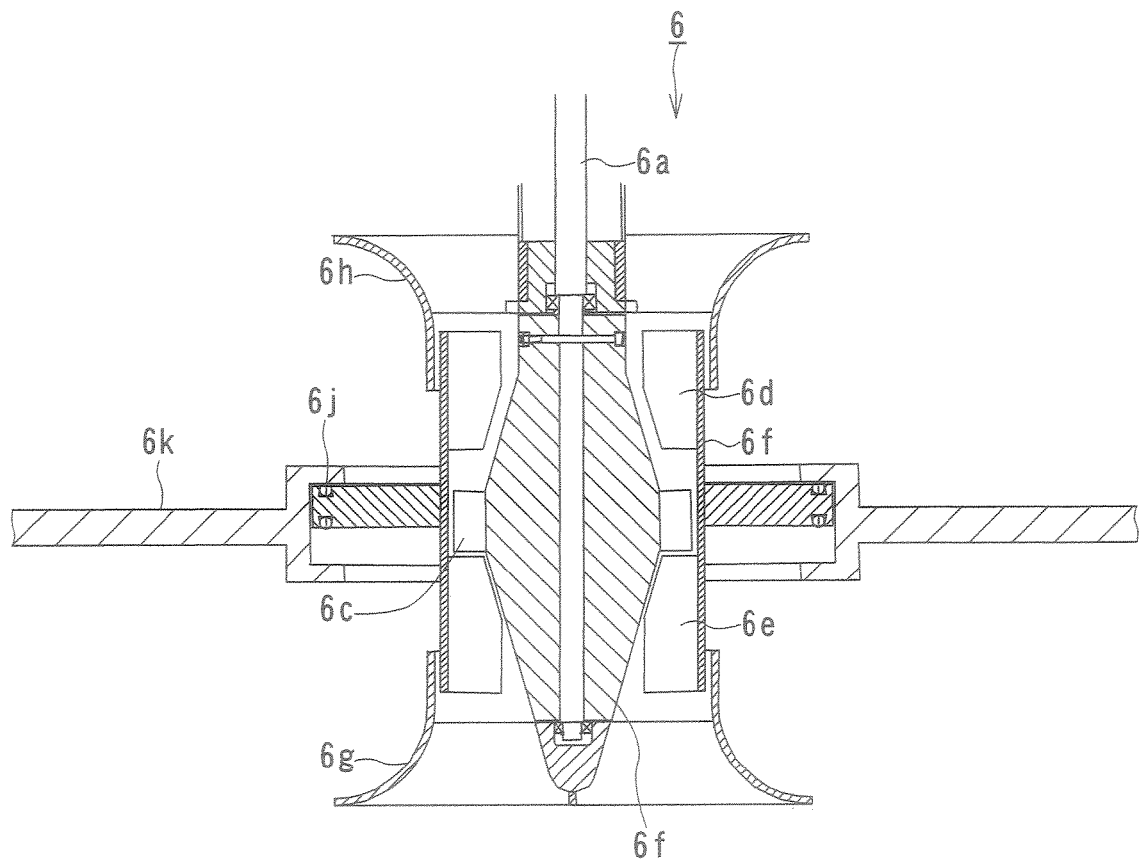
FIG. 7B is a schematic cross-sectional view that shows an example configuration of an air turbine in the structure of FIG. 6, showing the structure of a floating nozzle moving means for which a piston is used.

As shown in FIG. 7B, in place of the diaphragm 6i shown in FIG. 7A, the piston device including a piston 6j and a cylinder 6k may be used. That is, the cylinder 6k is connected to the casing 6f. The piston 6j is provided in the cylinder chamber and is movable in the vertical direction in response to air pressure from the air chamber. This vertical movement moves the floating nozzle The other components are the same as those shown in FIG. 7A and are denoted by the same reference signs, and the description is omitted.

Figure 14:
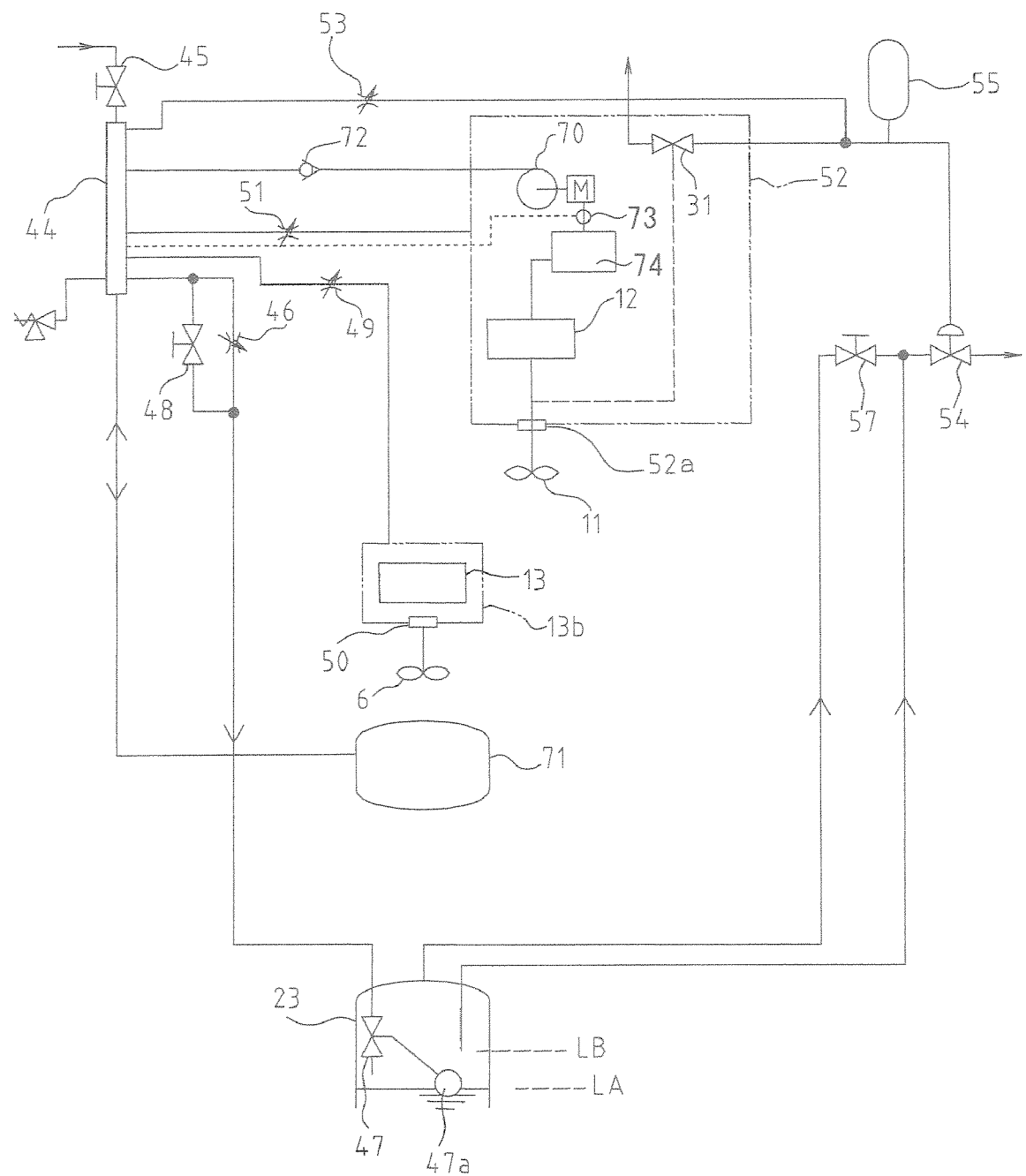
FIG. 14 is a block diagram that shows one example of a high-pressure gas system according to another embodiment of the present invention.

When the piston device is thus used, it may be expected that durability be further improved as compared to the diaphragm FIG. 14 is a block diagram that shows an example of a high-pressure gas system according to another embodiment of the present invention. Note that it is suitable for the case directed to collecting electric power as a first product. In this embodiment, the wave activated power generation device according to the present invention has the same outer shape as the preceding embodiment. Other than the configuration in which a compressor 70 and a pressure switch 73 are provided in the control portion (control chamber) and only first tank is used as an air tank, the other configuration is substantially the same as those of the embodiment shown in FIG. 12. Therefore, the same reference signs are assigned to the same or corresponding components to those in FIG. 12, and the description is omitted.

In this embodiment, electricity that is obtained by wave activated power generation is transmitted to a collecting device that is floating on the water or to a land by means of a submarine cable and is utilized as electric power.

The compressor 70 is provided in the control chamber that stores the wind turbine generator at the uppermost portion. The compressor 70 is driven by a battery power source 74 that stores electric power generated by the wind turbine generator 12. Compressed air generated by the compressor 70 is stored in an air tank 71 via a check valve 72 As the pressure in the air tank reaches a predetermined value, the pressure switch 73 is activated and the compressor is then stopped. Compressed air stored in the air tank is used as a pressure supply source to the buoyancy control chamber 2(23) and as a pressure source of the pressure regulating valve 54 that is activated upon emergency evacuation.

In other words, part of electricity generated by wave activated power generation is used to compress air and the compressed air is stored. The high-pressure gas is used as a source of driving pressure of the control system to adjust buoyancy or to evacuate the device from strong wind.

A preferred embodiment and its alternative embodiment according to the present invention are described above. Some combinations of the plurality of above constructed wave activated power generation devices according to the present invention come closer to practical application.

Figure 16:
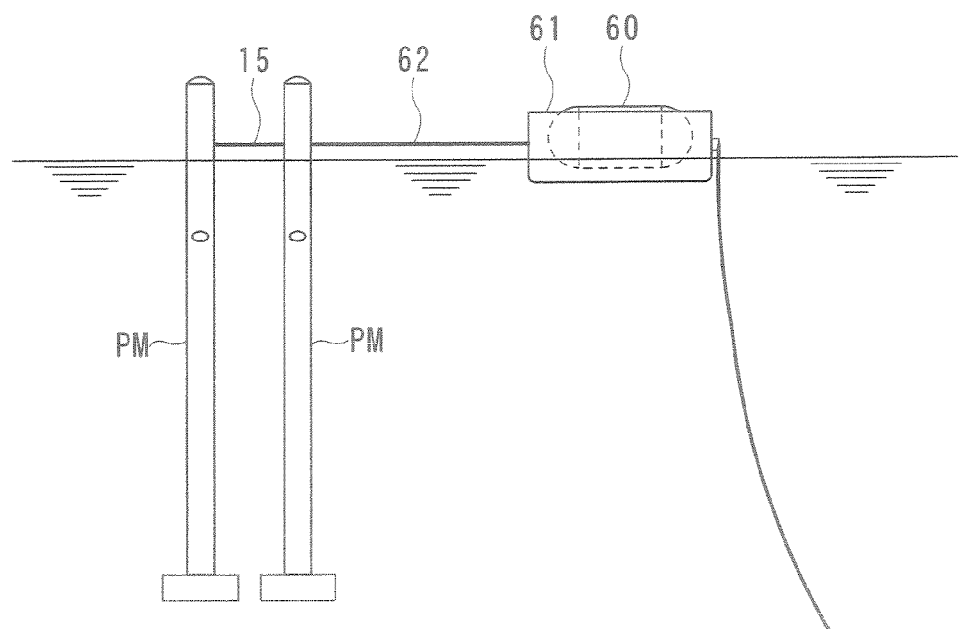
FIG. 16 is a schematic side view of FIG. 15.

That is, as shown in FIG. 1 and FIG. 16, the plurality of wave activated power generation devices PM are coupled together in accordance with the magnitude of power generation to form a wave activated power generation plant 100.

The power generation plant 100 includes a power generation cluster that is formed by coupling the plurality of wave activated power generation devices PM by means of link members 15. A collecting tank 60 collects and stores electric power as a first product generated by the wave activated power generation devices and hydrogen gas as a second product via a collecting cable 62. The collecting tank 60 is accommodated in a boat 61. Note that electric power may be collected directly by a land-based apparatus through a cable, or the like.

Figure 15:
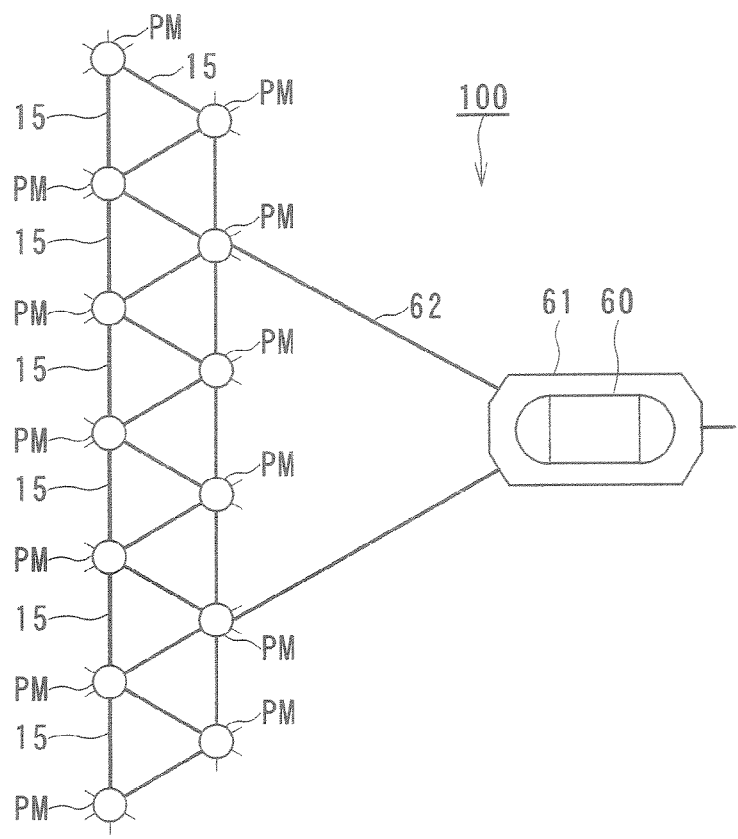
FIG. 15 is a schematic plan view of a wave activated power generation plant according to another embodiment of the present invention.
Figure 17:
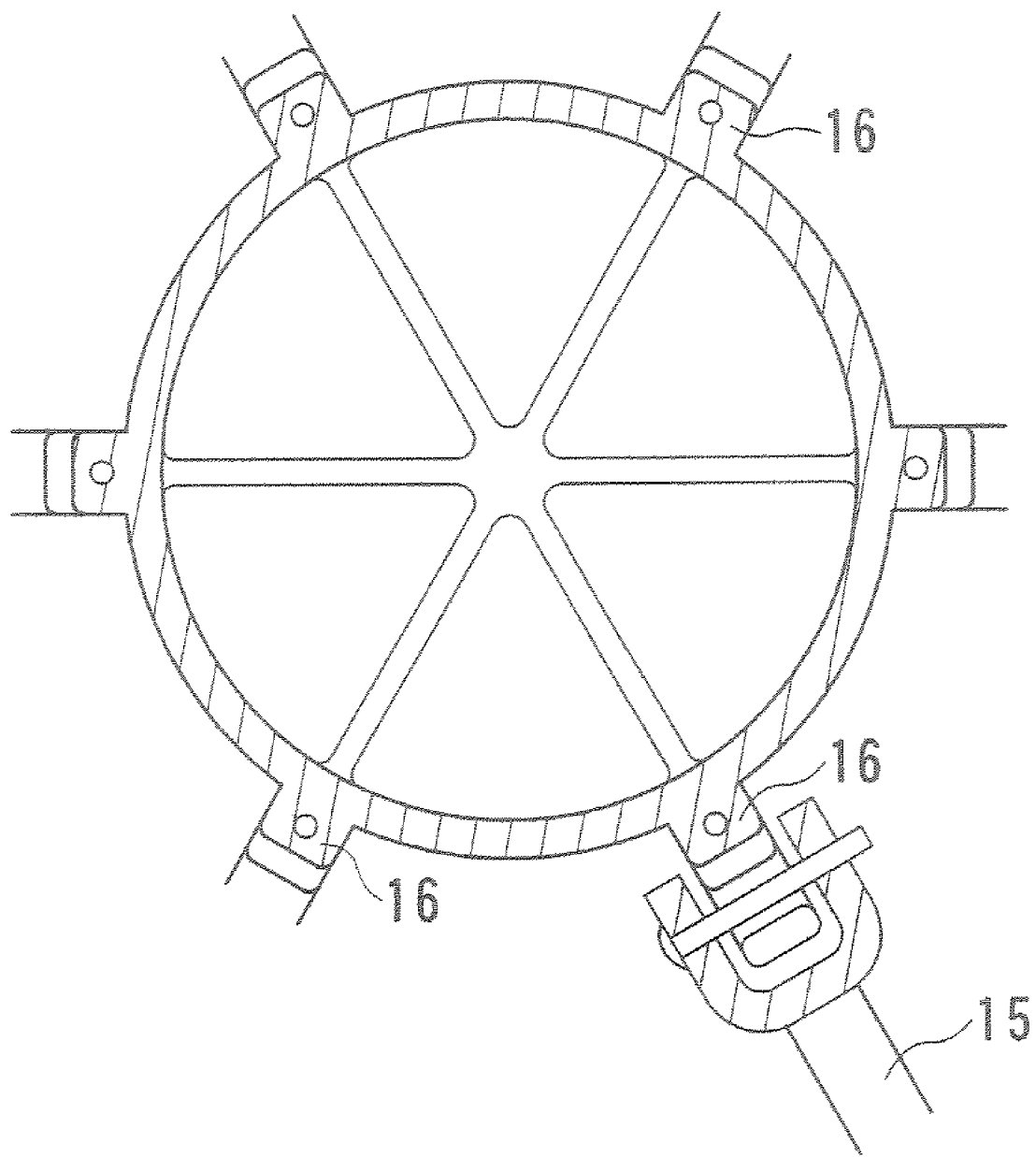
FIG. 17 is a schematic cross-sectional view that shows link portion of the wave activated power generation devices according to the embodiment of the present invention.

The link members 15 are generally pivotally coupled through joints to the link portions 16 that are provided on the outer wall of the air chamber 5 of the floating body 1, as shown in FIG. 6. In the embodiment shown in FIG. 15, six link members 15 are provided at six positions of the outer peripheral portion, being spaced apart with a equal angular interval of 60 degrees, the state of which is shown in FIG. 17.

In the embodiment thus shown in the drawing, any adjacent wave activated power generation devices are coupled by the link members 15 that extend zigzag with an angular interval of 60 degrees to form the wave activated power generation plant 100. However, the number and arrangement of wave activated power generation devices are not specifically limited to this zigzag shape. As far as the wave activated power generation devices do not bump or contact each other and their movement are not restricted, various forms may be applicable in accordance with its installation area, target power generation capacity, and the like. It is not limited to the one shown in the drawing.

According to the above described wave activated power generation plant 100, the wave activated power generation cluster is formed of the plurality of wave activated power generation devices. This allows electric power and generated hydrogen to be efficiently and stably collected.

As the pressure in the collecting tank 60 that is floating on the sea reaches a pressure value that corresponds to the depth at which the electrolyzer 25 is located, hydrogen begins to accumulate in the cylindrical member BY at the lowermost portion of the floating body 1 This increases the buoyancy and the floating body 1 thereby floats to the surface and finally hydrogen generation stops. Thus, by observing the amount of projection of the floating body, the time for collecting hydrogen in the wave activated power generation plant may be recognized.

As described above, according to the wave activated power generation device of the present invention and the wave activated power generation plant utilizing the wave activated power generation devices, the floating body that forms the body of the device is not fixed to the sea floor but it may be anchored. Its management is easy, and there is little possibility of being damaged by the size of waves. In addition, in the depth of the sea where water is almost stationary without being affected by surface waves, water resistance becomes maximum when the floating body is moved up and down by the difference between buoyancy and weight, while on the other hand near the surface of the sea, force applied to the floating body by the waves becomes minimum. Thus, power generation utilizing wave energy may be performed efficiently.

The floating body is divided into three sections, that is, the uppermost portion, the intermediate portion, and the lowermost portion, and in addition, the intermediate portion is constructed by axially coupling unit members each having a predetermined length. Thus, the overall length of the floating body may be selected by changing the number in which members having the predetermined length are provided for the intermediate portion in accordance with the depth of the sea, annual average wave height, annual average wave period, and so forth. Therefore, it is advantageous in that wide range of installation conditions is applicable without any change in the basic design. Further, the unit length members are formed by die forming using plastic material. As a result, it is advantageous in standardization and mass production.

Furthermore, by coupling the plurality of wave activated power generation devices according to the present invention, various exemplary embodiments may be rendered in accordance with the installation conditions and in response to a request. The invention having high industrial applicability is provided accordingly.

The invention claimed is:

1. A wave activated power generation device comprising:
a cylindrical floating body anchored on water and extending in a vertical direction relative to a surface of the water;
a ballast provided at a lower end portion of the floating body; and
a power generating equipment provided at an upper end portion of the floating body, wherein
the floating body includes a buoyancy control chamber that allows the floating body to vertically float in the water and that adjusts a position of the floating body relative to the surface of the water to a predetermined height in accordance with a relation between buoyancy of the floating body and weight of the ballast, and an air chamber that is formed between the buoyancy control chamber and the power generating equipment,
the power generating equipment includes an air turbine provided above the air chamber and driven by an air flow generated between an inside and outside of the air chamber by vertical motion of the surface of the water, and a generator rotationally driven by the air turbine, and
the air turbine always rotates in one direction independently from a direction of a reciprocating air flow generated between the inside and outside of the air chamber, and wherein the air turbine includes a floating nozzle movable by a predetermined distance in a direction of a rotary shaft thereof in accordance with a direction of the air flow.

2. The wave activated power generation device according to claim 1, wherein a natural period T of vertical motion of the floating body is calculated by the following equation using an area of a horizontal cross-section of a cylindrical portion of the floating body and a mass of the wave activated power generation device:

$$T = 2\pi \times SQR(M/(S \times \rho \times g))$$

where "T" is a natural period (s) of vertical motion of the floating body, "S" is a horizontal cross-sectional area (m$^2$) of an upper half cylindrical portion of the floating body, "M" is an overall mass (kg) including seawater inside the wave activated power generation device, "$\pi$" is the ratio of the circumference of a circle to its diameter, "$\rho$" is a density (kg/m$^3$) of seawater, "g" is the acceleration (m/s$^2$) due to gravity, and "SQR(x)" is the function calculating a square root of x, and
wherein the natural period T is in a range of 0.8 to 1.6 times an annual average wave period at an anchored area.

3. The wave activated power generation device according to claim 1, wherein a diaphragm is used as means for moving the floating nozzle.

4. The wave activated power generation device according to claim 1, wherein a piston is used as means for moving the floating nozzle.

5. The wave activated power generation device according to claim 1, further comprising an electrolyzer provided near the ballast provided at the lowermost portion of the floating body for electrolyzing water using electric power that is outputted from the generator, and a space provided near the lowermost portion of the floating body for collecting and storing hydrogen generated by the electrolyzer.

6. The wave activated power generation device according to claim 1, wherein the floating body is divided into three sections of an upper portion, an intermediate portion, and a lower portion, in which the intermediate portion is formed so that unit members each having a predetermined length are axially connected, wherein the overall length of the floating body is set by changing the number in which the unit members are provided, and the floating body is constructed and assembled by connecting the three sections by means of a connecting member.

7. The wave activated power generation device according to claim 6, wherein each unit member that constitutes the intermediate portion of the floating body is manufactured so as to provide a same shape by die forming using a plastic material.

8. The wave activated power generation device according to claim 6, wherein the connecting member is a wire rope.

9. The wave activated power generation device according to claim 6, wherein the connecting member is a through-bolt adjustable in length.

10. The wave activated power generation device according to claim 1, further comprising a watertight control chamber provided at the upper portion of the floating body, and an automatic valve provided in the control chamber, wherein the automatic valve automatically performs an opening operation in response to a detection of sea wind force larger than a predetermined value, so that the overall wave activated power generation device is evacuated into the water by discharging gas inside the buoyancy control chamber so as to decrease the buoyancy of the wave activated power generation device.

11. The wave activated power generation device according to claim 1, further comprising a wind turbine provided at an upper portion of the floating body, and a second generator provided at the upper portion of the floating body and driven by rotation of the wind turbine.

12. The wave activated power generation device according to claim 1, wherein the ballast has a ring shape and has an outer diameter larger than an outer diameter of the cylindrical portion of the floating body.

13. The wave activated power generation device according to claim 1, further comprising a pressure regulating valve is provided at the cylindrical portion of a portion of the floating body, which constitutes the air chamber, wherein the pressure regulating valve is configured to detect pressure in the air chamber so as to introduce ambient air into the air chamber when the pressure is reduced and comes closer to a vacuum.

14. A wave activated power generation plant, comprising:
a plurality of wave activated power generation devices that are anchored on water;
at least one linking device that couples the plurality of wave activated power generation devices with a predetermined interval therebetween; and
a product collecting device connected to the linking device, wherein
each of the wave activated power generation devices includes a cylindrical floating body anchored on the water and extending in a vertical direction relative to a surface of the water, a ballast provided at a lower end portion of the floating body, and a power generating equipment provided at an upper end portion of the floating body,
the floating body includes a buoyancy control chamber that allows the floating body to vertically float in the water and that adjusts a position of the floating body relative to the surface of the water to a predetermined height in accordance with a relation between buoyancy of the floating body and weight of the ballast, and an air chamber formed between the buoyancy control chamber and the power generating equipment, the power generating equipment includes an air turbine provided above the air chamber and driven by an air flow generated between an inside and outside of the air chamber by vertical motion of the surface of the water, and a generator that is rotationally driven by the air turbine, the air turbine always rotates in one direction independently from a direction of a reciprocating air flow generated between the inside and outside of the air chamber, and wherein the air turbine includes a floating nozzle movable by a predetermined distance in a direction of a rotary shaft thereof in accordance with a direction of the air flow, and the linking device includes at least one joint member provided on an outer peripheral portion of the floating body at a predetermined angular interval, and a link member pivotally coupled to the joint member.

15. The wave activated power generation plant according to claim 14, wherein the product collecting device is a hydrogen collecting device, the product collecting device includes an electrolyzer provided near the ballast provided at the lower end portion of the floating body and electrolyzing water using electric power that is outputted from the generator, and a hydrogen collecting portion provided near the lowermost portion of the floating body and storing and collecting hydrogen generated by the electrolyzer.

16. The wave activated power generation plant according to claim 14, wherein the floating body is divided into three sections of an upper portion, an intermediate portion, and a lower portion, in which the intermediate portion is formed so that unit members each having a predetermined length are axially connected, the overall length of the floating body is set by changing the number in which the unit members are provided, and the floating body is constructed and assembled by connecting the three sections by means of a through-bolt adjustable in length.

17. The wave activated power generation plant according to claim 16, wherein the through-bolt has a hollow shape and includes one of an electric power line for supplying electric power that is outputted from the generator to the electrolyzer and a conduit member for leading hydrogen generated at the electrolyzer to the product collecting device.

18. The wave activated power generation plant according to claim 14, wherein the product collecting device is an electric power collecting device connected to each of the wave activated power generation devices.

19. A wave activated power generation device comprising:
a cylindrical floating body anchored on water and extending in a vertical direction relative to a surface of the water;
a ballast provided at a lower end portion of the floating body; and
a power generating equipment provided at an upper end portion of the floating body, wherein
the floating body includes an upper portion having a smooth surface in order to minimize a force that causes the floating body to move vertically due to waves, a buoyancy control chamber that allows the floating body to vertically float in the water and that adjusts a position of the floating body relative to the surface of the water to a predetermined height in accordance with a relation between buoyancy of the floating body and weight of the ballast, and an air chamber that is formed between the buoyancy control chamber and the power generating equipment,
the power generating equipment includes an air turbine provided above the air chamber and driven by an air flow generated between an inside and outside of the air chamber by vertical motion of the surface of the water, and a generator rotationally driven by the air turbine, and
the air turbine always rotates in one direction independently from a direction of a reciprocating air flow generated between the inside and outside of the air chamber, and wherein the air turbine includes a floating nozzle movable by a predetermined distance in a direction of a rotary shaft thereof in accordance with a direction of the air flow.

\* \* \* \* \*